(12) United States Patent
Goodman et al.

(10) Patent No.: US 8,046,832 B2
(45) Date of Patent: Oct. 25, 2011

(54) SPAM DETECTOR WITH CHALLENGES

(75) Inventors: Joshua Theodore Goodman, Redmond, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 10/180,565

(22) Filed: Jun. 26, 2002

(65) Prior Publication Data

US 2004/0003283 A1    Jan. 1, 2004

(51) Int. Cl.
    *G08B 23/00*    (2006.01)
(52) U.S. Cl. .............................. 726/23; 726/24; 709/206
(58) Field of Classification Search .................. 713/188, 713/189, 193, 151–154, 168–170; 380/255; 726/22–25, 11–13; 709/206, 207, 204, 224, 709/225, 229, 231–233, 237, 201, 203; 707/3, 707/6; 718/103, 102; 705/67
    See application file for complete search history.

(56) References Cited

U.S. PATENT DOCUMENTS

| | | |
|---|---|---|
| 5,377,354 A | 12/1994 | Scannell et al. |
| 5,459,717 A | 10/1995 | Mullan et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |
| 5,911,776 A | 6/1999 | Guck |
| 5,930,471 A | 7/1999 | Milewski et al. |
| 5,999,932 A | 12/1999 | Paul |
| 5,999,967 A | 12/1999 | Sundsted |
| 6,003,027 A | 12/1999 | Prager |
| 6,023,723 A | 2/2000 | McCormick et al. |
| 6,041,324 A | 3/2000 | Earl et al. |
| 6,047,242 A * | 4/2000 | Benson .......................... 702/35 |
| 6,052,709 A | 4/2000 | Paul |
| 6,072,942 A | 6/2000 | Stockwell et al. |
| 6,101,531 A | 8/2000 | Eggleston et al. |
| 6,112,227 A | 8/2000 | Heiner |
| 6,122,657 A | 9/2000 | Hoffman, Jr. et al. |
| 6,128,608 A | 10/2000 | Barnhill |
| 6,144,934 A | 11/2000 | Stockwell et al. |

(Continued)

FOREIGN PATENT DOCUMENTS

| | | |
|---|---|---|
| CN | 1350247 A | 5/2002 |

(Continued)

OTHER PUBLICATIONS

U.S. Appl. No. 10/208,150, filed Jul. 29, 2002, Andaker.

(Continued)

*Primary Examiner* — Nirav B Patel
(74) *Attorney, Agent, or Firm* — Lee & Hayes, PLLC

(57) ABSTRACT

A system and method facilitating detection of unsolicited e-mail message(s) with challenges is provided. The invention includes an e-mail component and a challenge component. The system can receive e-mail message(s) and associated probabilities that the e-mail message(s) are spam. Based, at least in part, upon the associated probability, the system can send a challenge to a sender of an e-mail message. The challenge can be an embedded code, computational challenge, human challenge and/or micropayment request. Based, at least in part, upon a response to the challenge (or lack of response), the challenge component can modify the associated probability and/or delete the e-mail message.

34 Claims, 12 Drawing Sheets

U.S. PATENT DOCUMENTS

| | | |
|---|---|---|
| 6,157,921 A | 12/2000 | Barnhill |
| 6,161,130 A * | 12/2000 | Horvitz et al. ............... 709/206 |
| 6,167,434 A | 12/2000 | Pang |
| 6,192,114 B1 | 2/2001 | Council |
| 6,192,360 B1 | 2/2001 | Dumais et al. |
| 6,195,698 B1 * | 2/2001 | Lillibridge et al. ........... 709/225 |
| 6,199,102 B1 | 3/2001 | Cobb |
| 6,199,103 B1 | 3/2001 | Sakaguchi et al. |
| 6,249,807 B1 | 6/2001 | Shaw et al. |
| 6,266,692 B1 | 7/2001 | Greenstein |
| 6,308,273 B1 | 10/2001 | Goertzel et al. |
| 6,314,421 B1 | 11/2001 | Sharnoff et al. |
| 6,321,267 B1 | 11/2001 | Donaldson |
| 6,324,569 B1 | 11/2001 | Ogilvie et al. |
| 6,327,617 B1 | 12/2001 | Fawcett |
| 6,330,590 B1 * | 12/2001 | Cotten ........................ 709/206 |
| 6,332,164 B1 | 12/2001 | Jain |
| 6,351,740 B1 | 2/2002 | Rabinowitz |
| 6,370,526 B1 | 4/2002 | Agrawal et al. |
| 6,393,465 B2 * | 5/2002 | Leeds .......................... 709/207 |
| 6,421,709 B1 | 7/2002 | McCormick et al. |
| 6,424,997 B1 | 7/2002 | Buskirk, Jr. et al. |
| 6,427,141 B1 | 7/2002 | Barnhill |
| 6,434,600 B2 | 8/2002 | Waite et al. |
| 6,449,635 B1 | 9/2002 | Tilden, Jr. et al. |
| 6,453,327 B1 | 9/2002 | Nielsen |
| 6,477,551 B1 | 11/2002 | Johnson et al. |
| 6,484,197 B1 | 11/2002 | Donohue |
| 6,484,261 B1 | 11/2002 | Wiegel |
| 6,505,250 B2 * | 1/2003 | Freund et al. ................ 709/226 |
| 6,519,580 B1 | 2/2003 | Johnson et al. |
| 6,546,390 B1 | 4/2003 | Pollack et al. |
| 6,546,416 B1 * | 4/2003 | Kirsch ........................ 709/206 |
| 6,592,627 B1 | 7/2003 | Agrawal et al. |
| 6,615,242 B1 | 9/2003 | Riemers |
| 6,618,747 B1 | 9/2003 | Flynn et al. |
| 6,633,855 B1 | 10/2003 | Auvenshine |
| 6,643,686 B1 | 11/2003 | Hall |
| 6,654,787 B1 | 11/2003 | Aronson et al. |
| 6,684,201 B1 | 1/2004 | Brill |
| 6,691,156 B1 | 2/2004 | Drummond et al. |
| 6,701,350 B1 | 3/2004 | Mitchell |
| 6,701,440 B1 | 3/2004 | Kim et al. |
| 6,704,772 B1 | 3/2004 | Ahmed et al. |
| 6,728,690 B1 | 4/2004 | Meek et al. |
| 6,732,149 B1 | 5/2004 | Kephart |
| 6,732,157 B1 | 5/2004 | Gordon et al. |
| 6,732,273 B1 * | 5/2004 | Byers .......................... 713/193 |
| 6,742,047 B1 | 5/2004 | Tso |
| 6,748,422 B2 | 6/2004 | Morin et al. |
| 6,751,348 B2 | 6/2004 | Buzuloiu et al. |
| 6,757,830 B1 | 6/2004 | Tarbotton et al. |
| 6,768,991 B2 | 7/2004 | Hearnden |
| 6,775,704 B1 * | 8/2004 | Watson et al. ............... 709/229 |
| 6,779,021 B1 | 8/2004 | Bates et al. |
| 6,785,820 B1 | 8/2004 | Muttik et al. |
| 6,842,773 B1 | 1/2005 | Ralston et al. |
| 6,853,749 B2 | 2/2005 | Watanabe et al. |
| 6,868,498 B1 * | 3/2005 | Katsikas ........................ 726/14 |
| 6,892,193 B2 | 5/2005 | Bolle et al. |
| 6,901,398 B1 | 5/2005 | Horvitz et al. |
| 6,915,334 B1 | 7/2005 | Hall |
| 6,920,477 B2 | 7/2005 | Mitzenmacher |
| 6,928,465 B2 | 8/2005 | Earnest |
| 6,957,259 B1 | 10/2005 | Malik |
| 6,971,023 B1 * | 11/2005 | Makinson et al. ........... 713/193 |
| 6,990,485 B2 | 1/2006 | Forman et al. |
| 7,003,555 B1 | 2/2006 | Jungck |
| 7,032,030 B1 | 4/2006 | Codignotto |
| 7,039,949 B2 * | 5/2006 | Cartmell et al. .................. 726/6 |
| 7,051,077 B2 | 5/2006 | Lin |
| 7,072,942 B1 | 7/2006 | Maller |
| 7,089,241 B1 | 8/2006 | Alspector et al. |
| 7,146,402 B2 | 12/2006 | Kucherawy |
| 7,155,243 B2 | 12/2006 | Baldwin et al. |
| 7,155,484 B2 | 12/2006 | Malik |
| 7,188,369 B2 | 3/2007 | Ho et al. |
| 7,206,814 B2 | 4/2007 | Kirsch |
| 7,219,148 B2 | 5/2007 | Rounthwaite et al. |
| 7,249,162 B2 | 7/2007 | Rounthwaite et al. |
| 7,263,607 B2 | 8/2007 | Ingerman et al. |
| 7,287,060 B1 | 10/2007 | McCown et al. |
| 7,293,063 B1 | 11/2007 | Sobel |
| 7,320,020 B2 | 1/2008 | Chadwick et al. |
| 7,321,922 B2 | 1/2008 | Zheng et al. |
| 7,359,941 B2 | 4/2008 | Doan et al. |
| 7,366,761 B2 | 4/2008 | Murray et al. |
| 7,574,409 B2 | 8/2009 | Patinkin |
| 7,600,255 B1 | 10/2009 | Baugher |
| 7,617,284 B2 * | 11/2009 | Salamuniccar ............... 709/206 |
| 7,711,779 B2 * | 5/2010 | Goodman et al. ............ 709/206 |
| 7,739,162 B1 * | 6/2010 | Pettay et al. ..................... 705/35 |
| 7,904,517 B2 * | 3/2011 | Kang et al. .................... 709/206 |
| 2001/0046307 A1 | 11/2001 | Wong |
| 2001/0049745 A1 | 12/2001 | Schoeffler |
| 2002/0016824 A1 | 2/2002 | Leeds |
| 2002/0016956 A1 | 2/2002 | Fawcett |
| 2002/0059425 A1 | 5/2002 | Belfiore et al. |
| 2002/0073157 A1 | 6/2002 | Newman et al. |
| 2002/0091738 A1 | 7/2002 | Rohrabaugh et al. |
| 2002/0124025 A1 | 9/2002 | Janakiraman et al. |
| 2002/0129111 A1 | 9/2002 | Cooper |
| 2002/0147782 A1 | 10/2002 | Dimitrova et al. |
| 2002/0169954 A1 | 11/2002 | Bandini et al. |
| 2002/0174185 A1 | 11/2002 | Rawat et al. |
| 2002/0184315 A1 | 12/2002 | Earnest |
| 2002/0199095 A1 * | 12/2002 | Bandini et al. ................ 713/151 |
| 2003/0009495 A1 | 1/2003 | Adjaoute |
| 2003/0009698 A1 * | 1/2003 | Lindeman et al. ............ 713/201 |
| 2003/0016872 A1 | 1/2003 | Sun |
| 2003/0037074 A1 | 2/2003 | Dwork et al. |
| 2003/0041126 A1 | 2/2003 | Buford et al. |
| 2003/0088627 A1 | 5/2003 | Rothwell et al. |
| 2003/0149733 A1 | 8/2003 | Capiel |
| 2003/0167311 A1 | 9/2003 | Kirsch |
| 2003/0191969 A1 * | 10/2003 | Katsikas ....................... 713/201 |
| 2003/0204569 A1 * | 10/2003 | Andrews et al. .............. 709/206 |
| 2003/0229672 A1 | 12/2003 | Kohn |
| 2004/0003283 A1 | 1/2004 | Goodman et al. |
| 2004/0015554 A1 * | 1/2004 | Wilson ......................... 709/206 |
| 2004/0019650 A1 | 1/2004 | Auvenshine |
| 2004/0019651 A1 | 1/2004 | Andaker |
| 2004/0054887 A1 | 3/2004 | Paulsen et al. |
| 2004/0059697 A1 * | 3/2004 | Forman .......................... 706/46 |
| 2004/0068543 A1 | 4/2004 | Seifert |
| 2004/0073617 A1 | 4/2004 | Milliken et al. |
| 2004/0083270 A1 | 4/2004 | Heckerman et al. |
| 2004/0093371 A1 | 5/2004 | Burrows et al. |
| 2004/0139160 A1 | 7/2004 | Wallace et al. |
| 2004/0139165 A1 | 7/2004 | McMillan et al. |
| 2004/0148330 A1 | 7/2004 | Alspector et al. |
| 2004/0177120 A1 | 9/2004 | Kirsch |
| 2004/0181571 A1 | 9/2004 | Atkinson et al. |
| 2004/0193684 A1 | 9/2004 | Ben-Yoseph |
| 2004/0199585 A1 | 10/2004 | Wang |
| 2004/0199594 A1 | 10/2004 | Radatti et al. |
| 2004/0205135 A1 | 10/2004 | Hallam-Baker |
| 2004/0210640 A1 | 10/2004 | Chadwick et al. |
| 2004/0215977 A1 | 10/2004 | Goodman et al. |
| 2004/0255122 A1 | 12/2004 | Ingerman et al. |
| 2004/0260776 A1 | 12/2004 | Starbuck et al. |
| 2005/0015455 A1 | 1/2005 | Liu |
| 2005/0015456 A1 | 1/2005 | Martinson, Jr. |
| 2005/0021649 A1 | 1/2005 | Goodman et al. |
| 2005/0041789 A1 | 2/2005 | Warren-Smith et al. |
| 2005/0050150 A1 | 3/2005 | Dinkin |
| 2005/0060643 A1 | 3/2005 | Glass et al. |
| 2005/0076084 A1 | 4/2005 | Loughmiller et al. |
| 2005/0080855 A1 | 4/2005 | Murray |
| 2005/0080889 A1 | 4/2005 | Malik et al. |
| 2005/0081059 A1 | 4/2005 | Bandini et al. |
| 2005/0091320 A1 | 4/2005 | Kirsch et al. |
| 2005/0091321 A1 | 4/2005 | Daniell et al. |
| 2005/0097174 A1 | 5/2005 | Daniell |
| 2005/0102366 A1 | 5/2005 | Kirsch |
| 2005/0108340 A1 | 5/2005 | Gleeson et al. |
| 2005/0114452 A1 | 5/2005 | Prakash |

| | | | |
|---|---|---|---|
| 2005/0120019 | A1 | 6/2005 | Rigoutsos et al. |
| 2005/0159136 | A1 | 7/2005 | Rouse et al. |
| 2005/0160148 | A1 | 7/2005 | Yu |
| 2005/0165895 | A1 | 7/2005 | Rajan et al. |
| 2005/0182735 | A1* | 8/2005 | Zager et al. ............... 705/67 |
| 2005/0188023 | A1 | 8/2005 | Doan et al. |
| 2005/0198270 | A1 | 9/2005 | Rusche et al. |
| 2005/0204005 | A1 | 9/2005 | Purcell et al. |
| 2005/0204006 | A1 | 9/2005 | Purcell et al. |
| 2005/0204159 | A1 | 9/2005 | Davis et al. |
| 2005/0228899 | A1 | 10/2005 | Wendkos et al. |
| 2006/0015942 | A1 | 1/2006 | Judge et al. |
| 2006/0026246 | A1 | 2/2006 | Fukuhara et al. |
| 2006/0031303 | A1 | 2/2006 | Pang |
| 2006/0031306 | A1 | 2/2006 | Haverkos |
| 2006/0031464 | A1 | 2/2006 | Bowman et al. |
| 2006/0036693 | A1 | 2/2006 | Hulten et al. |
| 2006/0036701 | A1 | 2/2006 | Bulfer et al. |
| 2006/0041505 | A1* | 2/2006 | Enyart ............... 705/40 |
| 2006/0047769 | A1 | 3/2006 | Davis et al. |
| 2006/0059238 | A1 | 3/2006 | Slater et al. |
| 2006/0123083 | A1 | 6/2006 | Goutte et al. |
| 2006/0137009 | A1 | 6/2006 | Chesla |
| 2006/0168017 | A1 | 7/2006 | Stern et al. |
| 2006/0265498 | A1 | 11/2006 | Turgeman et al. |
| 2007/0101423 | A1 | 5/2007 | Oliver et al. |
| 2007/0118759 | A1 | 5/2007 | Sheppard |
| 2007/0130350 | A1 | 6/2007 | Alperovitch et al. |
| 2007/0130351 | A1 | 6/2007 | Alperovitch et al. |
| 2007/0133034 | A1 | 6/2007 | Jindal et al. |
| 2007/0143407 | A1 | 6/2007 | Avritch et al. |
| 2007/0208856 | A1 | 9/2007 | Rounthwaite et al. |
| 2008/0016579 | A1 | 1/2008 | Pang |
| 2008/0104186 | A1 | 5/2008 | Wieneke et al. |
| 2008/0114843 | A1 | 5/2008 | Shinde et al. |
| 2008/0120413 | A1 | 5/2008 | Mody et al. |
| 2009/0157708 | A1 | 6/2009 | Bandini et al. |

FOREIGN PATENT DOCUMENTS

| | | |
|---|---|---|
| EP | 413 537 A2 | 2/1991 |
| EP | 720 333 A2 | 7/1996 |
| EP | 0720333 A2 | 7/1996 |
| EP | 1300997 | 11/2002 |
| EP | 1376427 | 3/2003 |
| EP | 1376427 A2 | 1/2004 |
| EP | 1376427 A3 | 1/2004 |
| JP | 10074172 A | 3/1998 |
| JP | 2000163341 A | 6/2000 |
| JP | 2001505371 | 4/2001 |
| JP | 2002149611 A | 5/2002 |
| JP | 2002164887 A | 6/2002 |
| JP | 2002330175 A | 11/2002 |
| JP | 2002537727 | 11/2002 |
| JP | 2003115925 A | 4/2003 |
| JP | 2003125005 | 4/2003 |
| JP | 2004186888 A | 7/2004 |
| KR | 20010088973 A | 9/2001 |
| KR | 20020063534 A | 8/2002 |
| TW | 519591 | 2/2003 |
| TW | 520483 | 2/2003 |
| TW | 521213 | 2/2003 |
| WO | WO 96/35994 | 11/1996 |
| WO | WO 99/10817 | 3/1999 |
| WO | WO9937066 A1 | 7/1999 |
| WO | WO9967731 | 12/1999 |
| WO | WO0146872 A1 | 6/2001 |
| WO | WO0219069 A2 | 3/2002 |
| WO | WO0223390 A2 | 3/2002 |
| WO | WO0230054 A1 | 4/2002 |
| WO | WO 02/071286 | 9/2002 |
| WO | WO02071286 | 9/2002 |
| WO | WO02082226 A2 | 10/2002 |
| WO | WO03054764 | 7/2003 |
| WO | WO2004054188 | 6/2004 |
| WO | WO 2004/059506 | 7/2004 |
| WO | WO2004059206 | 7/2004 |

OTHER PUBLICATIONS

U.S. Appl. No. 09/893,914, filed Jun. 28, 2001, Horvitz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2002, Maller.
U.S. Appl. No. 10/291,260, filed Nov. 8, 2002, Burrows.
Breiman, Friedman, Olshen, and Stone. "Classification and Regression Trees." Wadsworth & Brooks, Monterey, CA (1984).
Quinlan. "C4.5: Programs for Machine Learning." Morgan Kaufmann, San Francisco, CA (1993).
Hayes, Brian."Spam , Spam, Spam, Lovely Spam." American Scientist Online, Jun. 30, 2003. pp. 1-6. vol. 91.
Partial European Search Report, EP05100847, mailed Jun. 21, 2005, 5 pages.
European Search Report, dated June 9, 2005, mailed Aug. 22, 2005 for European Patent Application Serial No. EP04011978, 12 pages.
Yu Wu, et al., A New Anti-Spam Filter Based on Data Mining and Analysis of Email Security, Conference Proceedings of the SPIE, Data Mining and Knowledge Discovery Theory, Tools and Technolog V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
European Search Report, EP31087TE900, mailed Nov. 11, 2004.
J. Byrne, My Spamblock, Google, Jan. 19, 1997, 2 pages.
D. F. Skoll, How to Make Sure a Human is Sending You Mail, Google, Nov. 17, 1996, 2 pages.
L. M. Bowman, Hotmail Spam Filters Block Outgoing E-Mail, CNET NEWS.COM, Jan. 18, 2001, 3 pages.
David Madigan, "Statistics and the War on Spam," Rutgers University, pp. 1-13, 2003.
Padraig Cunningham, et al., "A Case-Based Approach to Spam Filtering that Can Track Concept Drift," Trinity College, Dublin,Department of Computer Science, May 13, 2003.
Mark Rosen, "E-mail Classification in the Haystack Framework," Massachusetts Institute of Technology, Feb. 2003.
Thorsten Joachims, Transductive Inference for Text Classification Using Support Vector Machines, in Proceedings of the 16th International Conference on Machine Learning, 1999, pp. 200-209, San Francisco, USA.
Kevin R. Gee, Using Latent Semantic Indexing to Filter Spam, Dept. of Computer Science and Engineering, University of Texas-Arlington, 5 pages, 2003.
Fabrizio Sebastiani. Machine Learning in Automated Text Categorization. ACM Computing Surveys, vol. 34 Issue 1, pp. 1-47, 2002.
I. Androutsopoulos, et al. Learning to Filter Spam E-mail: A Comparison of a Naive Bayesian and a Memory-based Approach. 4th PKDD's Workshop on Machine Learning and Textual Information Access, 2000. 13 pages.
I. Androutsopoulos, J. Koutsias, K.V. Chandrinos, C.D. Spyropoulos. An Experimental Comparison of Naive Bayesian and Keyword-based Anti-spam Filtering with Personal E-mail Messages. Proceedings of the 23rd ACM SIGIR Conference, pp. 160-167, 2000.
P. Pantel and D. Lin. SpamCop: A Spam Classification & Organization Program. In Proc. AAAI-1998 Workshop on Learning for Text Categorization, 1998. 8 pages.
G. Manco, E. Masciari, M. Ruffolo, and A. Tagarelli. Towards an Adaptive Mail Classifier. In Proc. of Italian Association for Artificial Intelligence Workshop, 2002. 12 pages.
Cormac O'Brien, et al., Spam Filters: Bayes vs. Chi-squared; Letters vs. Words, Proceedings of the 1st international symposium on Information and communication technologies, 2003, pp. 291- 296, Dublin, Ireland.
Olle Balter, et al., Bifrost Inbox Organizer: Giving users control over the inbox, NordiCHI 10/2, 2002, pp. 111-118, Arhus, Denmark.
Lorrie Faith Cranor, et al., Spam!, Communications of the ACM, 1998, pp. 74-83, vol. 41—No. 8.
John Wong, Preventing Spams and Relays, Linux Journal, Dec. 1998, 6 pages, vol. 1998 Issue 56es, Specialized Systems Consultants, Inc.

Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11, ACM.
Eric Allman, Spam, Spam, Spam, Spam, Spam, the FTC, and Spam, Queue, Sep. 2003, pp. 62-69, vol. 1 Issue 6, ACM.
Tom Fawcett, "In vivo" Spam Filtering: A Challenge Problem for KDD, SIGKDD Explorations, Dec. 2003, pp. 140-148, vol. 5 Issue 2, ACM.
J.D.M. Rennie. ifile: An Application of Machine Learning to E-Mail Filtering. Proceedings of the KDD-2000 Workshop on Text Mining, Sixth ACM SIGKDD International Conference on Knowledge Discovery and Data Mining, 2000. 6 pages.
S. Argamon, M. Koppel, and G. Avneri. Routing documents according to style. In First International Workshop on Innovative Information Systems, 1998. 8 pages.
K. Mock. An Experimental Framework for Email Categorization and Management. Proceedings of the 24th Annual International ACM SIGIR Conference, pp. 392-393, 2001.
Jose Maria Gomez Hidalgo, Evaluating Cost-Sensitive Unsolicited Bulk Email Categorization, SAC 2002, 2002, pp. 615-620, ACM, Madrid, Spain.
A.Z. Broder, et al. Syntactic Clustering of the Web. SRC Technical Note, Digital Corporation, Jul. 25, 1997. 13 pages.
P.Y. Simard, et al. Using Character Recognition and Segmentation to Tell Computer from Humans. International Conference on Document Analysis and Recogntion (ICDAR), IEEE Computer Society, Los Alamitos, pp. 418-423, 2003.
S. Li and H. Shum. Secure Human-Computer Identification against Peeping: A Survey. Technical Report, Microsoft Research, 2003. 53 pages.
D.A. Turner and D.M. Havey. Controlling Spam through Lightweight Currency. In Proc. of the Hawaii International Conference on Computer Sciences, Jan. 2004. 9 pages.
D. Turner and N. Deng. Payment-based Email. 5th International Conference on Software Engineering, Artificial Intelligence, Networking, and Parallel/Distributed Computing, Jun. 2004. 7 pages.
International Search Report, EP 03 00 6814, mailed Feb. 13, 2004.
Julian Byrne, My Spamblock, Newsgroup Citation, Online!, Jan. 19, 1997, XP002267503, news.admin.net-abuse.email, http://www.google.com/groups.
David Skoll, How to Make Sure a Human is Sending You Mail, Newsgroup Citation, Online!, Oct. 17, 1997, XP002267504, news.admin.net-abuse.usenet, http://groups.google.ca/groups.
Cynthia Dwork, et al.; "Pricing Via Processing or Combatting Junk Mail"; Presented at Crypto '92; pp. 1-11.
Thorsten Joachims; "Text Categorization with Support Vector Machines: Learning with Many Relevant Features"; LS-8 Report, Nov. 23, 1997, 18 pages.
Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.
Ellen Spertus; "Smokey: Automatic Recognition of Hostile Messages"; Proceedings of the Conference on Innovative Applications in Artificial Intelligence (IAAI), 1997, 8 pages.
Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.
Yiming Yang, et al.; "A Comparative Study on Feature Selection in Text Categorization"; School of Computer Science, Carnegie Mellon University, Pittsburgh, PA, and Verity, Inc., Sunnyvale, CA; 9 pages.
Yiming Yang, et al.; "An Example-Based Mapping Method for Text Categorization and Retrieval"; ACM Transactions on Information Systems, vol. 12, No. 3, Jul. 1994, pp. 252-277.
David D. Lewis, et al.; "A Comparison of Two Learning Algorithms for Text Categorization"; Third Annual Symposium on Document Analysis and Information Retrieval; Apr. 11-13, 1994; pp. 81-93.

Mehran Sahami; "Learning Limited Dependence Bayesian Classifiers"; in KDD-96: Proceedings of the Second International Conference on Knowledge Discovery and Data Mining; AAAI Press, 1996; Menlo Park, CA; pp. 335-338.
William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.
Makoto Iwayama, et al.; "Hierarchical Bayesian Clustering for Automatic Text Classifiation"; Natural Language; 1995; pp. 1322-1327.
David D. Lewis; "An Evaluation of Phrasal and Clustered Representations on a Text Categorization Task"; 15th Annual International SIGIR '92; Denmark 1992; pp. 37-50.
Daphne Koller, et al.; "Toward Optimal Feature Selection"; Machine Learning; Proc. of the Thirteenth International Conference, Morgan Kaufmann, 1996, 9 pages.
David Dolan Lewis; "Representation and Learning in Information Retrieval"; University of Massachusetts, 1992.
Tom Mitchell; "Machine Learning"; Carnegie Mellon University, Bayesian Learning, Chapter 6, pp. 180-184.
Y. H. Li, et al.; "Classification of Text Documents"; Department of Computer Science and Engineering, Michigan State University, E. Lansing, Michigan, The Computer Journal, vol. 41, No. 8, 1998; 537-546.
Juha Takkinen, et al.; "CAFE: A Conceptual Model for Managing Information in Electronic Mail"; Laboratory for Intelligent Information Systems, Department of Computer and Information Science, Linkoping University, Sweden, Conference on System Sciences, 1998 IEEE.
Jacob Palme, et al.; "Issues When Designing Filters in Messaging Systems"; Department of Computer and Systems Sciences, Stockholm University, Royal Institute of Technology, Skeppargarten 73, S-115 30, Stockholm, Sweden, Computer Communications; 1996; pp. 95-101.
"SwiftFile: An Intelligent Assistant for Organizing E-Mail"; Richard B. Segal, et al.; IBM Thomas J. Watson Research Center.
A Bayesian Approach to Filtering Junk E-Mail; Mehran Sahami, et al.; Stanford University.
European Search Report dated Apr. 6, 2006 and mailed Apr. 6, 2006 for EP 04102242, 3 pages.
Graham. "The Future of SPAM" (2003) Computer Journal, CSI Computer Security Institute, vol. 19, No. 1, 6 pages.
International Search Report dated Jan. 17, 2006, mailed Jan. 31, 2006, for PCT Application Serial No. PCT/US04/05501, 2 Pages.
Written Opinion of the International Preliminary Examining Authority mailed Nov. 30, 2005 for PCT/US03/41526, 5 pages.
OA dated Oct. 8, 2008 for U.S. Appl. No. 11/743,466, 43 pages.
OA dated Nov. 28, 2008 for U.S. Appl. No. 10/799,455, 53 pages.
OA dated Nov. 6, 2008 for U.S. Appl. No. 10/799,992, 46 pages.
OA dated Jan. 16, 2009 for U.S. Appl. No. 10/917,077, 34 pages.
"Clearswift Announces the Most Complete e-Policy-Based Email Content Security Product for Service Providers"; http://www.clearswift.com/news/item.aspx?ID=144. (Oct. 12, 2002).
Federal Trade Commission, "False Claims in Spam"; A report by the FTC's division of marketing practices, Apr. 30, 2003, http://www.ftc.gov/reports/spam/030429spamreport.pdf.
Hansell, "Internet Is Losing Ground in Battle Against Spam"; the New York Times: Technology section, Apr. 22, 2003.
Knowles, et al. "Stop, in the Name of Spam". Communications of the ACM, Nov. 1998, pp. 11-14, vol. 41 No. 11, ACM.
"MIME", The Microsoft Computer Dictionary, 5th ed. Redmond, WA; Microsoft Press. May 1, 2002.
Mimoso, "QuickTakes: Imagine Analysis, Filtering Comes to E-mail Security", http://searchsecurity.techtarget.com/originalContent.html (Feb. 5, 2002).
Mock, "An Experimental Framework for Email Categorization and Management" Proceedings of the 24th Annual International ACM SIGIR Conference, pp. 292-293. 2001.
Shimmin, B.F., "Effective use of electronic post", FENIX Publishing House, Rostov-na-Donu, 1998, pp. 229-249.
White, "How Computers Work"; QUE Publishing, 2004, pp. 238-239.

Kawamata, et al., "Internet Use Limitation", Started by Company, Part II. Full Monitoring/Limiting Software, Nikkei Computer, No. 469, Nikkei Business Publications, Inc, May 10, 1999, pp. 87-91.

How to Obscure Any URL, http:www.pc-help.org/obscure.htm, last viewed on Jan. 18, 2003, 10 pages.

Kohavi, "A study of cross-validation and bootstrap accuracy estimation and model selection", Proceedings of the Fourteenth International Joint Conference on Artificial Intelligence 2 (12), retrieved from <<http://dli.iiit.ac.in/ijcai/IJCAI-95-VOL2/PDF/016/pdf>>, 1995, pp. 1137-1143.

Translated Israel Office Action mailed Jan. 26, 2011 for Israeli Patent Application No. 206121, a counterpart foreign application of US Patent No. 7,558,832.

Federal Trade Commission. "False Claims in Spam", A report by the FTC's division of marketing practices, Apr. 30, 2003, http://www.ftc.gov/reports/spam/030429spamreport.pdf.

Hansell. "Internet is losing ground in battle against spam", The New York Times: Technology section, Apr. 22, 2003.

"Camram Postage Stamp Basics", Internet Citation, Jun. 9, 2002, 17 pages.

"Sender ID Framework Overview", retrieved from <<http://www.microsoft.com/mscorp/twc/privacy/spam/senderid/overview.mspx>> on Dec. 17, 2004, published Sep. 30, 2004.

"Sender ID: Two Protocols, Divided by a Common Syntax", retrieved from <<http://spf.pobox.com/senderid.html>> on Dec. 17, 2004, 2 pages.

"SPF: Sender Policy Framework", retrieved from <<http://spf.pobox.com>> on Dec. 17, 2004, Copyright IC Group, Inc., 2004, 1 page.

"The Coordinated Spam Reduction Initiative", Microsoft Corporation, Feb. 13, 2004, pp. 1-54.

\* cited by examiner

SPAM DETECTOR WITH CHALLENGES

TECHNICAL FIELD

The present invention relates generally to electronic mail (e-mail) and more particularly to a system and method employing unsolicited e-mail (spam) detection with challenges.

BACKGROUND OF THE INVENTION

Electronic messaging, particularly electronic mail ("e-mail") carried over the Internet, is rapidly becoming not only pervasive in society but also, given its informality, ease of use and low cost, a preferred mode of communication for many individuals and organizations.

Unfortunately, as has occurred with more traditional forms of communication (e.g., postal mail and telephone), e-mail recipients are increasingly being subjected to unsolicited mass mailings. With the explosion, particularly in the last few years, of Internet-based commerce, a wide and growing variety of electronic merchandisers is repeatedly sending unsolicited mail advertising their products and services to an ever expanding universe of e-mail recipients. Most consumers that order products or otherwise transact with a merchant over the Internet expect to and, in fact, regularly receive such merchant solicitations. However, electronic mailers are continually expanding their distribution lists to penetrate deeper into society in order to reach ever increasing numbers of recipients. For example, recipients who merely provide their e-mail addresses in response to perhaps innocuous appearing requests for visitor information generated by various web sites, often find, later upon receipt of unsolicited mail and much to their displeasure, that they have been included on electronic distribution lists. This occurs without the knowledge, let alone the assent, of the recipients. Moreover, as with postal direct mail lists, an electronic mailer will often disseminate its distribution list, whether by sale, lease or otherwise, to another such mailer, and so forth with subsequent mailers. Consequently, over time, e-mail recipients often find themselves barraged by unsolicited mail resulting from separate distribution lists maintained by a wide and increasing variety of mass mailers. Though certain avenues exist, based on mutual cooperation throughout the direct mail industry, through which an individual can request that his(her) name be removed from most direct mail postal lists, no such mechanism exists among electronic mailers.

Once a recipient finds him(her)self on an electronic mailing list, that individual can not readily, if at all, remove his (her) address from it, thus effectively guaranteeing that he(she) will continue to receive unsolicited mail—often in increasing amounts from that list and oftentimes other lists as well. This occurs simply because the sender either prevents a recipient of a message from identifying the sender of that message (such as by sending mail through a proxy server) and hence precludes the recipient from contacting the sender in an attempt to be excluded from a distribution list, or simply ignores any request previously received from the recipient to be so excluded.

An individual can easily receive hundreds of unsolicited postal mail messages over the course of a year, or less. By contrast, given the ease and insignificant cost through which e-distribution lists can be readily exchanged and e-mail messages disseminated across large numbers of addressees, a single e-mail addressee included on several distribution lists can expect to receive a considerably larger number of unsolicited messages over a much shorter period of time. Furthermore, while many unsolicited e-mail messages (e.g., offers for discount office or computer supplies or invitations to attend conferences of one type or another) are benign; others, such as pornographic, inflammatory and abusive material, can be highly offensive to certain recipients.

Unsolicited e-mail messages are commonly referred to as "spam". Similar to the task of handling junk postal mail, an e-mail recipient must sift through his(her) incoming mail to remove spam. Unfortunately, the choice of whether a given e-mail message is spam or not is highly dependent on the particular recipient and content of the message—what may be spam to one recipient may not be so to another. Frequently, an electronic mailer will prepare a message such that its true content is not apparent from its subject line and can only be discerned from reading the body of the message. Hence, the recipient often has the unenviable task of reading through each and every message he(she) receives on any given day, rather than just scanning its subject line, to fully remove spam messages. Needless to say, such filtering (often manually-based) can be a laborious, time-consuming task.

In an effort to automate the task of detecting abusive newsgroup messages (so-called "flames"), the art teaches an approach of classifying newsgroup messages through a rule-based text classifier. See, E. Spertus "Smokey: Automatic Recognition of Hostile Messages", *Proceedings of the Conference on Innovative Applications in Artificial Intelligence (IAAI)*, 1997. Here, semantic and syntactic textual classification features are first determined by feeding an appropriate corpus of newsgroup messages, as a training set, through a probabilistic decision tree generator. Given handcrafted classifications of each of these messages as being a "flame" or not, the generator delineates specific textual features that, if present or not in a message, can predict whether, as a rule, the message is a flame or not. Those features that correctly predict the nature of the message with a sufficiently high probability are then selected for subsequent use. Thereafter, to classify an incoming message, each sentence in that message is processed to yield a multi-element (e.g., 47 element) feature vector, with each element simply signifying the presence or absence of a different feature in that sentence. The feature vectors of all sentences in the message are then summed to yield a message feature vector (for the entire message). The message feature vector is then evaluated through corresponding rules produced by the decision tree generator to assess, given a combination and number of features that are present or not in the entire message, whether that message is either a flame or not. For example, as one semantic feature, the author noticed that phrases having the word "you" modified by a certain noun phrase, such as "you people", "you bozos", "you flamers", tend to be insulting. An exception is the phrase "you guys" which, in use, is rarely insulting. Therefore, one feature is whether any of these former word phrases exist. The associated rule is that, if such a phrase exists, the sentence is insulting and the message is a flame. Another feature is the presence of the word "thank", "please" or phrasal constructs having the word "would" (as in: "Would you be willing to e-mail me your logo") but not the words "no thanks". If any such phrases or words are present (with the exception of "no thanks"), an associated rule, which the author refers to as the "politeness rule" categorizes the message as polite and hence not a flame. With some exceptions, the rules used in this approach are not site-specific, that is, for the most part they use the same features and operate in the same manner regardless of the addressee being mailed.

A rule based textual e-mail classifier, here specifically one involving learned "keyword-spotting rules", is described in W. W. Cohen, "Learning Rules that Classify E-mail", 1996

*AAAI Spring Symposium on Machine Learning in Information Access,* 1996 (hereinafter the "Cohen" publication). In this approach, a set of e-mail messages previously classified into different categories is provided as input to the system. Rules are then learned from this set in order to classify incoming e-mail messages into the various categories. While this method does involve a learning component that allows for automatic generation of rules, these rules simply make yes/no distinctions for classification of e-mail messages into different categories without providing any confidence measure for a given prediction. Moreover, in this work, the actual problem of spam detection was not addressed. In this regard, rule-based classifiers suffer various serious deficiencies which, in practice, would severely limit their use in spam detection. First, existing spam detection systems require users to manually construct appropriate rules to distinguish between legitimate mail and spam. Most recipients will not bother to undertake such laborious tasks. As noted above, an assessment of whether a particular e-mail message is spam or not can be rather subjective with its recipient. What is spam to one recipient may, for another, not be. Furthermore, non-spam mail varies significantly from person to person. Therefore, for a rule based-classifier to exhibit acceptable performance in filtering most spam from an incoming mail stream, the recipient must construct and program a set of classification rules that accurately distinguishes between what constitutes spam and what constitutes non-spam (legitimate) e-mail. Properly doing so can be an extremely complex, tedious and time-consuming task even for a highly experienced and knowledgeable computer user.

Second, the characteristics of spam and non-spam e-mail may change significantly over time; rule-based classifiers are static (unless the user is constantly willing to make changes to the rules). Accordingly, mass e-mail senders routinely modify content of their messages in a continual attempt to prevent ("outwit") recipients from initially recognizing these messages as spam and then discarding those messages without fully reading them. Thus, unless a recipient is willing to continually construct new rules or update existing rules to track changes to spam (as that recipient perceives such changes), then, over time, a rule-based classifier becomes increasingly inaccurate at distinguishing spam from desired (non-spam) e-mail for that recipient, thereby further diminishing utility of the classifier and frustrating the user/recipient.

Alternatively, a user might consider employing a method for learning rules (as in the Cohen publication) from their existing spam in order to adapt, over time, to changes in an incoming e-mail stream. Here, the problems of a rule-based approach are more clearly highlighted. Rules are based on logical expressions; hence, as noted above, rules simply yield yes/no distinctions regarding the classification for a given e-mail message. Problematically, such rules provide no level of confidence for their predictions. Inasmuch as users may have various tolerances as to how aggressive they would want to filter their e-mail to remove spam, then, in an application such as detecting spam, rule-based classification would become rather problematic. For example, a conservative user may require that the system be very confident that a message is spam before discarding it, whereas another user many not be so cautious. Such varying degrees of user precaution cannot be easily incorporated into a rule-based system such as that described in the Cohen publication.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system for detection of unsolicited messages (e.g., e-mail). The system includes an e-mail component and a challenge component. The system can receive message(s) and associated probabilities that the message(s) are spam. Based, at least in part, upon the associated probability the system can send a challenge to a sender of a message. The e-mail component can store message(s) and associated probabilities that the messages are spam. In one example, e-mail message(s) are stored with different attributes, such as folder name, based on associated probabilities that the email message(s) are spam. In another example, e-mail message(s) having associated probabilities less than or equal to a first threshold are stored in a legitimate e-mail folder while e-mail message(s) having associated probabilities greater than the first threshold are stored in a spam folder. In yet another implementation of the invention, e-mail message(s) having associated probabilities less than or equal to a first threshold are stored in a legitimate e-mail folder, e-mail message(s) having associated probabilities greater than the first threshold, but less than or equal to a second threshold are stored in a questionable spam folder. Those e-mail message(s) having associated probabilities greater than the second threshold are stored in a spam folder. It is to be appreciated that the first threshold and/or the second threshold can be fixed, based on user preference(s) and/or adaptive (e.g., based, at least in part, upon available computational resources).

It will be appreciated that numbers other than probabilities, such as the score from a Support Vector Machine, a neural network, etc. can serve the same purpose as probabilities—in general, the numeric output of any machine learning algorithm can be used in place of a probability in accordance with an aspect of the present invention. Similarly, some machine learning algorithms, such as decision trees, output categorical information, and this too can be used in place of a probability combined with a threshold.

The challenge component can send a challenge to a sender of an e-mail message having an associated probability greater than a first threshold. For example, the challenge can be based, at least in part, upon a code embedded within the challenge (e.g., alphanumeric code). In responding to the challenge, the sender of the e-mail can reply with the code. In one example, the sender's system can be adapted to automatically retrieve the embedded code and respond to the challenge. Alternatively and/or additionally, the sender can be prompted to respond to the challenge (e.g., manually). The use of a challenge based on an embedded code can increase the bandwidth and/or computational load of sender(s) of spam, thus, serving as a deterrent to sending of spam. It is to be appreciated that the challenge can be any of a variety of suitable types (e.g., computational challenge, a human challenge and/or a micropayment request). The challenge can be fixed and/or variable. For example, with an increased associated probability, the challenge component can send a more difficult challenge or one that requires a greater micropayment.

The challenge component can modify the associated probability that the e-mail message is spam based, at least in part, upon a response to the challenge. For example, upon receipt of an appropriate (e.g., correct) response to the challenge, the challenge component can decrease the associated probability that the e-mail message is spam. In one example, the e-mail message is moved from a spam folder to a legitimate e-mail folder. In another implementation, the e-mail message is moved from a questionable spam folder to a legitimate e-mail folder. Upon receipt of an inappropriate (e.g., incorrect) response to the challenge and/or failure to receive a response to the challenge in a particular time period (e.g., 4 hours), the challenge component can increase the associated probability that the e-mail message is spam. For example, the e-mail message can be moved from a questionable spam folder to a spam folder.

Another aspect of the present invention provides for the system to further include a mail classifier. The mail classifier receives e-mail message(s), determines the associated probability that the e-mail message is spam and stores the e-mail message(s) and associated probabilities in the e-mail component. Accordingly, the mail classifier analyzes message content for a given recipient and distinguishes, based on that content and for that recipient, between spam and legitimate (non-spam) messages and so classifies each incoming e-mail message for that recipient.

Additionally and/or alternatively, e-mail message(s) can be marked with an indication of likelihood (probability) that the message is spam; message(s) assigned intermediate probabilities of spam can be moved, based on that likelihood, to questionable spam folder(s). Based, at least in part, upon information provided by the mail classifier, the challenge component can send a challenge to a sender of an e-mail message having an associated probability greater than a first threshold.

Yet another aspect of the present invention provides for the system to further include spam folder(s) and legitimate e-mail folder(s). The mail classifier determines the associated probability that an e-mail message is spam and stores the e-mail message in the spam folder(s) or the legitimate e-mail folder (s) (e.g., based on a first threshold). Incoming e-mail message (s) are applied to an input of the mail classifier, which, in turn, probabilistically classifies each of these messages as either legitimate or spam. Based on its classification, the message is routed to either of the spam folder(s) or the legitimate e-mail folder(s). Thereafter, the challenge component can send a challenge to a sender of an e-mail message stored in the spam folder(s) (e.g., having an associated probability greater than the first threshold). Based, at least in part, upon a response to the challenge, the challenge component can move the e-mail message from the spam folder(s) to the legitimate e-mail folder(s). For example, upon receipt of an appropriate (e.g., correct) response to the challenge, the challenge component can move the e-mail message from the spam folder(s) to the legitimate e-mail folder(s). Furthermore, upon receipt of an inappropriate (e.g., incorrect) response to the challenge and/ or failure to receive a response to the challenge in a particular time period (e.g., 4 hours), the challenge component can delete the e-mail message from the spam folder(s) and/or change attribute(s) of the e-mail message stored in the spam folder(s).

Another aspect of the present invention provides for a system to further include a legitimate e-mail sender(s) store and/or a spam sender(s) store. The legitimate e-mail sender(s) store stores information (e.g., e-mail address) associated with sender(s) of legitimate e-mail. E-mail message(s) from sender(s) identified in the legitimate e-mail sender(s) store are generally not challenged by the challenge component. Information (e.g., e-mail address(es)) can be stored in the legitimate e-mail sender(s) store based on user selection (e.g., "do not challenge" particular sender command), a user's address book, address(es) to which a user has sent at least a specified number of e-mail messages and/or by the challenge component. The legitimate e-mail sender(s) store can further store a confidence level associated with a sender of legitimate e-mail. E-mail message(s) having associated probabilities less than or equal to the associated confidence level of the sender are not challenged by the challenge component while those e-mail message(s) having associated probabilities greater than the associated confidence level are challenged by the challenge component. The spam sender(s) store stores information (e.g., e-mail address) associated with a sender of spam. Information can be stored in the spam sender(s) store by a user and/or by the challenge component.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
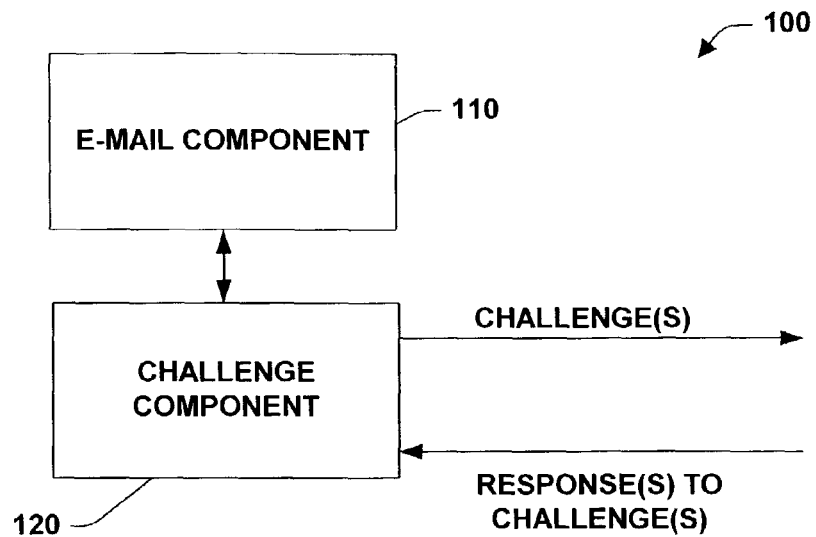
FIG. 1 is a block diagram of a system for detection of unsolicited e-mail in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a system 100 for detection of unsolicited messages (e.g., e-mail) in accordance with an aspect of the present invention is illustrated. The system 100 includes an e-mail component 110 and a challenge component 120. The system 100 can receive e-mail message(s) and associated probabilities that the e-mail message(s) are spam. Based, at least in part, upon the associated probability the system 100 can send a challenge to a sender of an e-mail message.

The e-mail component 110 receives and/or stores e-mail message(s) receives and/or computes associated probabilities that the e-mail messages are spam. For example, the e-mail component 110 can store information based, at least in part, upon information received from a mail classifier (not shown). In one example, e-mail message(s) are stored in the e-mail component 110 based on associated probabilities that the email message(s) are spam. In another example, the e-mail component 110 receives e-mail message(s) and computes associated probabilities that the e-mail message(s) are spam.

The challenge component 120 can send a challenge to a sender of an e-mail message having an associated probability greater than a first threshold. For example, the challenge can be based, at least in part, upon a code embedded within the challenge (e.g., alphanumeric code). In responding to the challenge, the sender of the e-mail can reply with the code. In one example, the sender's system (not shown) can be adapted to automatically retrieve the embedded code and respond to the challenge. Alternatively and/or additionally, the sender can be prompted to respond to the challenge (e.g., manually). The use of a challenge based on an embedded code can increase the bandwidth and/or computational load of sender (s) of spam, thus, serving as a deterrent to the sending of spam.

Additionally and/or alternatively the challenge can be a computational challenge, a human challenge and/or a micropayment request. These challenges and responses to these challenges are discussed more fully below. Further, the challenge can be fixed and/or variable. For example, with an increased associated probability, the challenge component 120 can send a more difficult challenge or one that requires a greater micropayment.

For example, a micropayment request can optionally utilize one-time-use spam certificates. A system 100 can put a "hold" on a received spam certificate. When a user of the system 100 reads the message and marks it as spam, the spam certificate is invalidated—sender unable to use spam certificate any further. If the message is not marked as spam, the hold is released thus allowing the sender to reuse the spam certificate (e.g., sender of message not charged money). In an alternate implementation, the spam certificate is always invalidated at receipt, regardless of whether the message was marked as spam or not.

With regard to a computational challenge, in one implementation a challenge sender (message receiver) can determine what the computational challenge should be. However, in another implementation, the challenge is uniquely determined by some combination of the message content, the time of receipt or sending of the message, the message sender, and, importantly, the message recipient. For example, the computational challenge may be based on a one-way hash of these quantities. If the challenge sender (message recipient) is allowed to choose the challenge, than a spammer might be able to use the following technique. He subscribes to mailing lists or otherwise generates mail from users. Thus, responders send messages back to the spammer to which the spammer responds with a computational challenge of his choice. In particular, the spammer can choose challenges that legitimate users have previously sent to the spammer in response to spam! Some percentage of the recipients of the spammer's challenges solve the challenges, thus allowing the spammer to then answer the challenges sent to the spammer. In one implementation, the computational challenge is based on a one-way hash of the message (including time and recipient stamps), making it virtually impossible for sender or receiver to determine the challenge, but making it possible for each to verify that a challenge serves its intended purpose.

The challenge component 120 can modify the associated probability that the e-mail message is spam based, at least in part, upon a response to the challenge. For example, upon receipt of an appropriate (e.g., correct) response to the challenge, the challenge component 120 can decrease the associated probability that the e-mail message is spam. In one example, the e-mail message is moved from a spam folder to a legitimate e-mail folder. In another example, the e-mail message is moved from a questionable spam folder to a legitimate e-mail folder. Moreover, upon receipt of an inappropriate (e.g., incorrect) response to the challenge and/or failure to receive a response to the challenge in a particular time period (e.g., 4 hours), the challenge component 120 can increase the associated probability that the e-mail message is spam.

In one implementation, a user is given a choice of challenges. For example, the choice of challenges can be based upon a filter.

Further, instead of storing the e-mail message, the system 100 can "bounce" the message, thus, necessitating the sender to resend the message along with the response to the challenge.

While FIG. 1 is a block diagram illustrating components for the system 100, it is to be appreciated that the challenge component 120 can be implemented as one or more computer components, as that term is defined herein. Thus, it is to be appreciated that computer executable components operable to implement the system 100 and/or the challenge component 120 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 2:
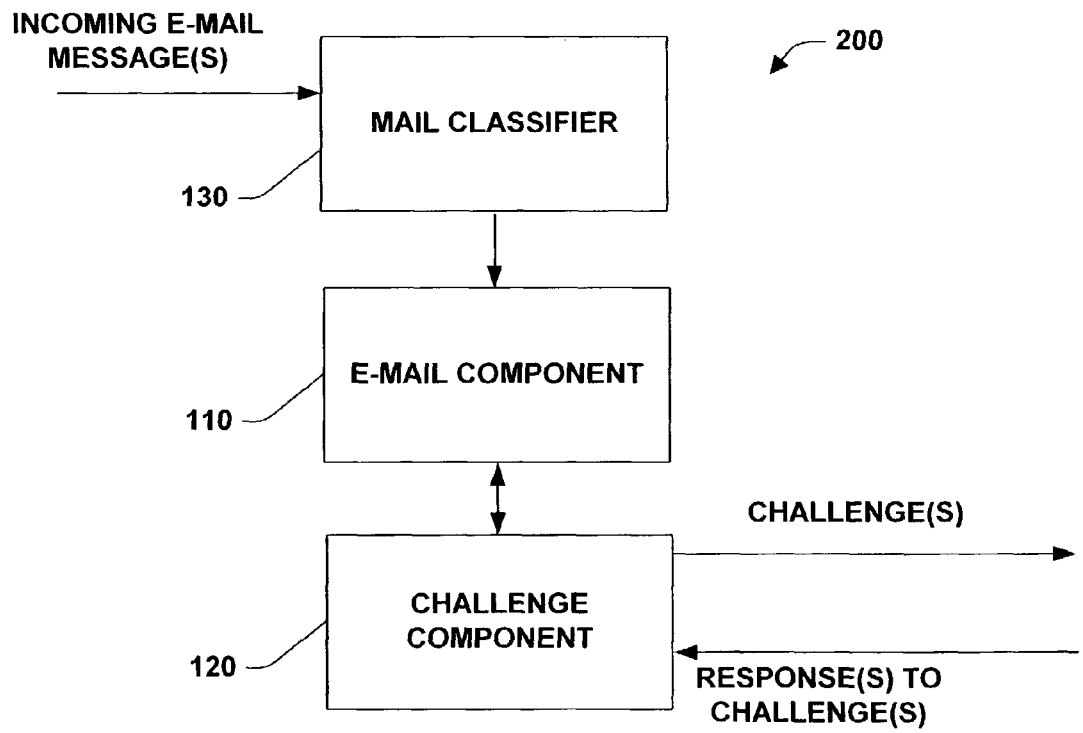
FIG. 2 is a block diagram of a system for detection of unsolicited e-mail in accordance with an aspect of the present invention.

Turning to FIG. 2, a system 200 for detection of unsolicited e-mail in accordance with an aspect of the present invention is illustrated. The system 200 includes an e-mail component 110, a challenge component 120 and a mail classifier 130. An exemplary mail classifier 130 is set forth in greater detail in copending U.S. patent application entitled A TECHNIQUE WHICH UTILIZES A PROBABILISTIC CLASSIFIER TO DETECT "JUNK" E-MAIL, having Ser. No. 09/102,837 the entirety of which is hereby incorporated by reference. In one example, the mail classifier 130 receives e-mail message(s), determines the associated probability that the e-mail message is spam and stores the e-mail message(s) and associated probabilities in the e-mail component 110. The mail classifier 130 analyzes message content for a given recipient and distinguishes, based on that content and for that recipient, between spam and legitimate (non-spam) messages and so classifies each incoming e-mail message for that recipient.

In another example, each incoming e-mail message (in a message stream) is first analyzed to assess which one(s) of a set of predefined features, particularly characteristic of spam, the message contains. These features (e.g., the "feature set") include both simple-word-based features and handcrafted features, the latter including, for example, special multi-word phrases and various features in e-mail messages such as non-word distinctions. Generally speaking, these non-word distinctions collectively relate to, for example, formatting, authoring, delivery and/or communication attributes that, when present in a message, tend to be indicative of spam—they are domain-specific characteristics of spam. Illustratively, formatting attributes may include whether a predefined word in the text of a message is capitalized, or whether that text contains a series of predefined punctuation marks. Delivery attributes may illustratively include whether a message contains an address of a single recipient or addresses of a plurality of recipients, or a time at which that message was transmitted (mail sent in the middle of the night is more likely to be spam). Authoring attributes may include, for example, whether a message comes from a particular e-mail address. Communication attributes can illustratively include whether a message has an attachment (a spam message rarely has an attachment), or whether the message was sent by a sender having a particular domain type (most spam appears to originate from ".com" or ".net" domain types). Handcrafted features can also include tokens or phrases known to be, for example, abusive, pornographic or insulting; or certain punctuation marks or groupings, such as repeated exclamation points or numbers, that are each likely to appear in spam. The specific handcrafted features are typically determined through human judgment alone or combined with an empirical analysis of distinguishing attributes of spam messages.

A feature vector, with one element for each feature in the set, is produced for each incoming e-mail message. That element simply stores a binary value specifying whether the corresponding feature is present or not in that message. The vector can be stored in a sparse format (e.g., a list of the positive features only). The contents of the vector are applied as input to a probabilistic classifier, preferably a modified support vector machine (SVM) classifier, which, based on the features that are present or absent from the message, generates a probabilistic measure as to whether that message is spam or not. This measure is then compared against a preset threshold value. If, for any message, its associated probabilistic measure equals or exceeds the threshold, then this message is classified as spam (e.g., stored in a spam folder). Alternatively, if the probabilistic measure for this message is less than the threshold, then the message is classified as legitimate (e.g., stored in a legitimate mail folder). The classification of each message can also be stored as a separate field in the vector for that message. The contents of the legitimate mail folder can then be displayed by a client e-mail program (not shown) for user selection and review. The contents of the spam folder will only be displayed by the client e-mail program upon a specific user request.

Furthermore, the mail classifier 130 can be trained using a set of M e-mail messages (e.g., a "training set", where M is an integer) that have each been manually classified as either legitimate or spam. In particular, each of these messages is analyzed to determine from a relatively large universe of n possible features (referred to herein as a "feature space"), including both simple-word-based and handcrafted features, just those particular N features (where n and N are both integers, n>N) that are to comprise the feature set for use during subsequent classification. Specifically, a matrix (typically sparse) containing the results for all n features for the training set is reduced in size through application of Zipf's Law and mutual information, both as discussed in detail infra to the extent necessary, to yield a reduced N-by-m feature matrix. The resulting N features form the feature set that will be used during subsequent classification. This matrix and the known classifications for each message in the training set are then collectively applied to the mail classifier 130 for training thereof.

Furthermore, should a recipient manually move a message from one folder to another and hence reclassify it, such as from being legitimate into spam, the contents of either or both folders can be fed back as a new training set to re-train and hence update the classifier. Such re-training can occur as a result of each message reclassification; automatically after a certain number of messages have been reclassified; after a given usage interval (e.g., several weeks or months) has elapsed; or upon user request. In this manner, the behavior of the classifier can advantageously track changing subjective perceptions and preferences of its particular user. Alternatively, e-mail messages may be classified into multiple categories (subclasses) of spam (e.g., commercial spam, pornographic spam and so forth). In addition, messages may be classified into categories corresponding to different degrees of spam (e.g., "certain spam", "questionable spam", and "non-spam").

Based, at least in part, upon information provided by the mail classifier 130, the challenge component 120 can send a challenge to a sender of an e-mail message having an associated probability greater than a first threshold. For example, the challenge can be based, at least in part, upon a code embedded within the challenge (e.g., alphanumeric code). In responding to the challenge, the sender of the e-mail can reply with the code. The sender's system (not shown) can be adapted to automatically retrieve the embedded code and respond to the challenge. Alternatively and/or additionally, the sender can be prompted to respond to the challenge (e.g., manually). The use of a challenge based on an embedded code can increase the bandwidth and/or computational load of sender(s) of spam, thus, serving as a deterrent to the sending of spam. It is to be appreciated that any type of challenge (e.g., a computational challenge, a human challenge, a micropayment request) suitable for carrying out the present invention can be employed and all such types of challenges are intended to fall within the scope of the hereto appended claims.

The challenge component 120 can modify the associated probability that an e-mail message is spam based, at least in part, upon a response to the challenge. For example, upon receipt of an appropriate (e.g., correct) response to the challenge, the challenge component 120 can decrease the associated probability that the e-mail message is spam.

Upon receipt of an inappropriate (e.g., incorrect) response to the challenge and/or failure to receive a response to the challenge in a particular time period (e.g., 4 hours), the challenge component 120 can increase the associated probability that the e-mail message is spam. It is to be appreciated that the mail classifier 130 can be a computer component as that term is defined herein.

Figure 3:
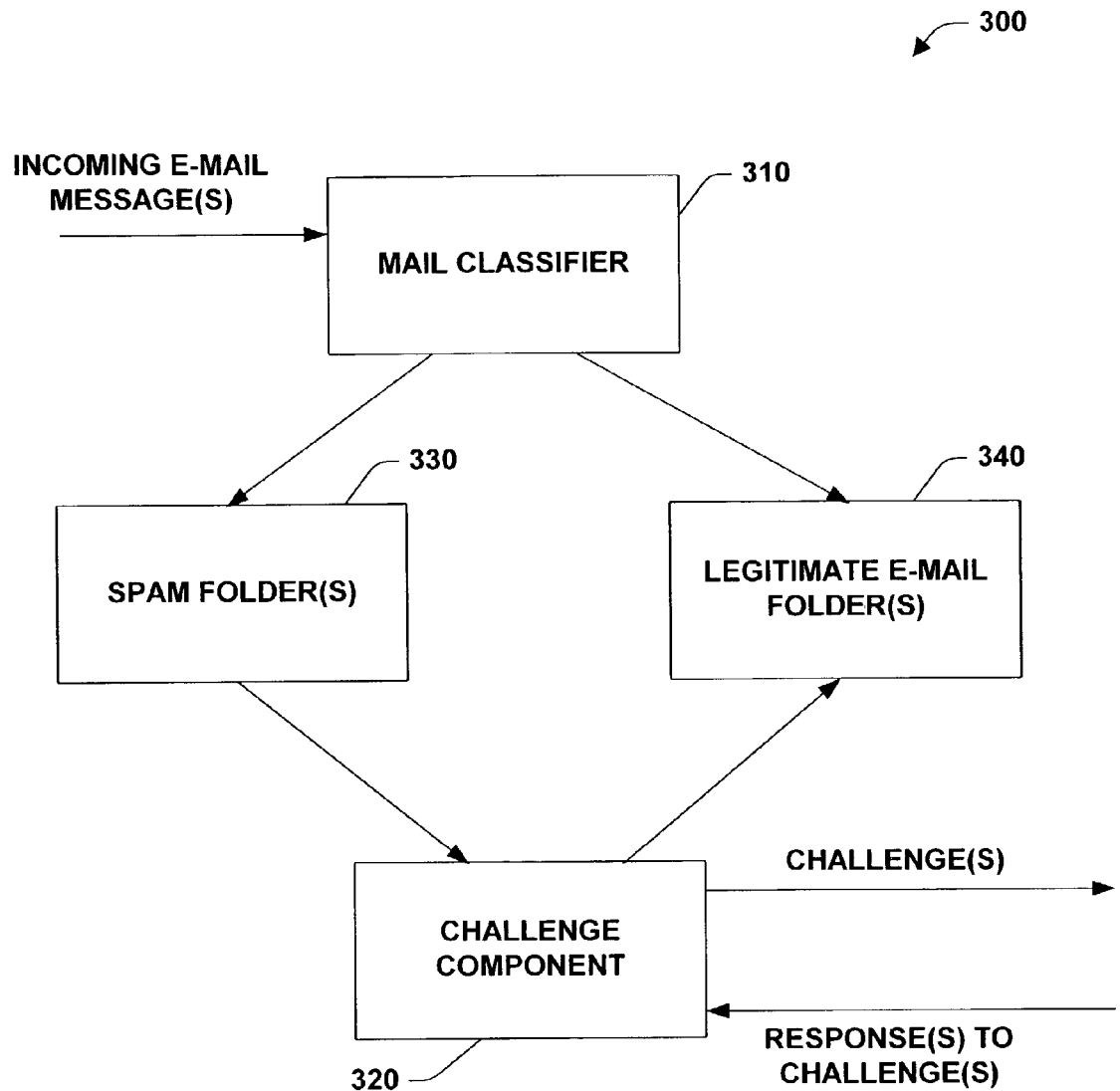
FIG. 3 is a block diagram of a system for detection of unsolicited e-mail in accordance with an aspect of the present invention.

Referring next to FIG. 3, a system 300 for detection of unsolicited e-mail in accordance with an aspect of the present invention is illustrated. The system 300 includes a mail classifier 310, a challenge component 320, spam folder(s) 330 and legitimate e-mail folder(s) 340. In one implementation, the spam folder(s) 330 and/or the legitimate e-mail folder(s) 340 can be virtual, that is, storing information associated with e-mail message(s) (e.g., link to e-mail message(s)) with the e-mail message(s) stored elsewhere. Or, in another implementation, rather than folders, an attribute of the message, can simply be set.

As discussed supra, the mail classifier 310 determines the associated probability that an e-mail message is spam and stores the e-mail message in the spam folder(s) 330 or the legitimate e-mail folder(s) 340 (e.g., based on a first threshold). Incoming e-mail message(s) are applied to an input of the mail classifier 310, which, in turn, probabilistically classifies each of these messages as either legitimate or spam. Based on its classification, the e-mail message is routed to either of the spam folder(s) 330 or the legitimate e-mail folder(s) 340. Thus, e-mail message(s) having associated probabilities less than or equal to a first threshold are stored in a legitimate e-mail folder(s) 340 while e-mail message(s) having associated probabilities greater than the first threshold are stored in a spam folder(s) 330. The first threshold can be fixed, based on user preference(s) and/or adaptive (e.g., based, at least in part, upon available computational resources).

Thereafter, the challenge component 320 can send a challenge to a sender of an e-mail message stored in the spam folder(s) (e.g., having an associated probability greater than the first threshold). For example, the challenge can be based, at least in part, upon a code embedded within the challenge, a computational challenge, a human challenge and/or a micropayment request. Based, at least in part, upon a response to the challenge, the challenge component 320 can move the e-mail message from the spam folder(s) 330 to the legitimate e-mail folder(s) 340. For example, upon receipt of an appropriate (e.g., correct) response to the challenge, the challenge component 320 can move the e-mail message from the spam folder(s) 330 to the legitimate e-mail folder(s) 340.

Upon receipt of an inappropriate (e.g., incorrect) response to the challenge and/or failure to receive a response to the challenge in a particular time period (e.g., 4 hours), the challenge component 320 can delete the e-mail message from the spam folder(s) 330 and/or change attribute(s) of the e-mail message stored in the spam folder(s) 330. For example, display attribute(s) (e.g., color) of the e-mail message can be changed to bring to a user's attention the increased likelihood of the e-mail message being spam.

Figure 4:
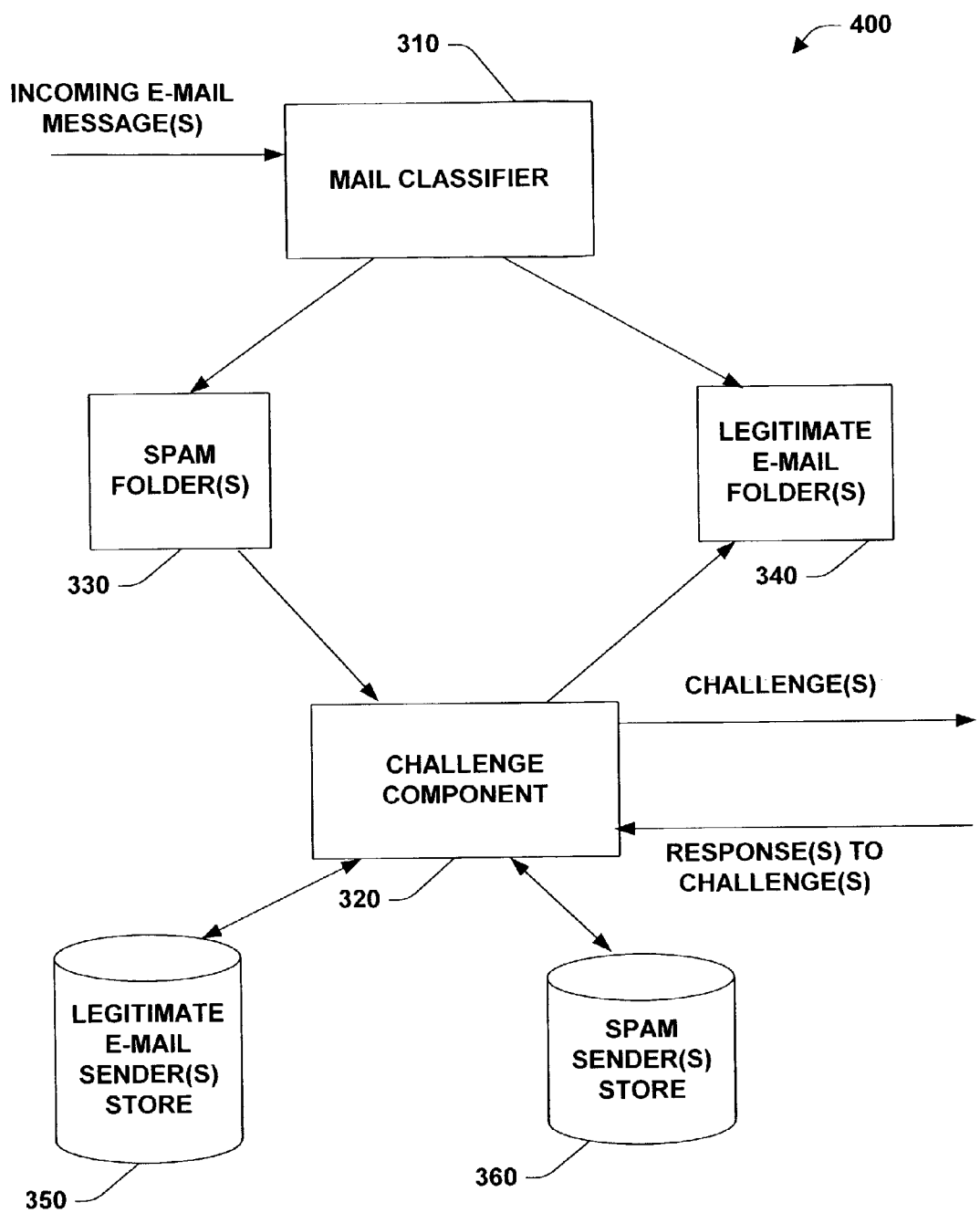
FIG. 4 is a block diagram of a system for detection of unsolicited e-mail in accordance with an aspect of the present invention.

Next, turning to FIG. 4, a system 400 for detection of unsolicited e-mail in accordance with an aspect of the present invention is illustrated. The system 400 includes a mail classifier 310, a challenge component 320, spam folder(s) 330 and legitimate e-mail folder(s) 340. The system 400 further includes a legitimate e-mail sender(s) store 350 and/or a spam sender(s) store 360. The legitimate e-mail sender(s) store 350 stores information (e.g., e-mail address) associated with sender(s) of legitimate e-mail. E-mail message(s) from sender(s) identified in the legitimate e-mail sender(s) store 350 are generally not challenged by the challenge component 320. Accordingly, in one example, e-mail message(s) stored in the spam folder(s) 330 by the mail classifier 310 are moved to the legitimate mail folder(s) 340 if the sender of the e-mail message is stored in the legitimate e-mail sender(s) store 350.

Information (e.g., e-mail address(es)) can be stored in the legitimate e-mail sender(s) store 350 based on user selection (e.g., "do not challenge" particular sender command), a user's address book, address(es) to which a user has sent at least a specified number of e-mail messages and/or by the challenge component 320. For example, once a sender of an e-mail message has responded correctly to a challenge, the challenge component 320 can store information associated with the sender (e.g., e-mail address) in the legitimate e-mail sender(s) store 350.

The legitimate e-mail sender(s) store 350 can further retain a confidence level associated with a sender of legitimate e-mail. E-mail message(s) having associated probabilities less than or equal to the associated confidence level of the sender are not challenged by the challenge component 320 while those e-mail message(s) having associated probabilities greater than the associated confidence level are challenged by the challenge component 320. For example, the confidence level can be based, at least in part, upon the highest associated probability challenge to which the sender has responded.

In one implementation, a sender can be removed from the legitimate e-mail sender(s) store 350 based, at least in part, upon a user's action (e.g., e-mail message from the sender deleted as spam). In accordance with another aspect, sender(s) are added to the legitimate e-mail sender(s) store 350 after a user has sent one e-mail message to the sender—this can be useful for mailing list(s).

The spam sender(s) store 360 stores information (e.g., e-mail address) associated with a sender of spam. Information can be stored in the spam sender(s) store 360 by a user and/or by the challenge component 320. For example, once a user has deleted a particular e-mail message as spam, information associated with the sender of the e-mail message can be stored in the spam sender(s) store 360. In another example, information associated with a sender of an e-mail message that incorrectly responded to a challenge and/or failed to respond to the challenge can be stored in the spam sender(s) store 360.

Figure 5:
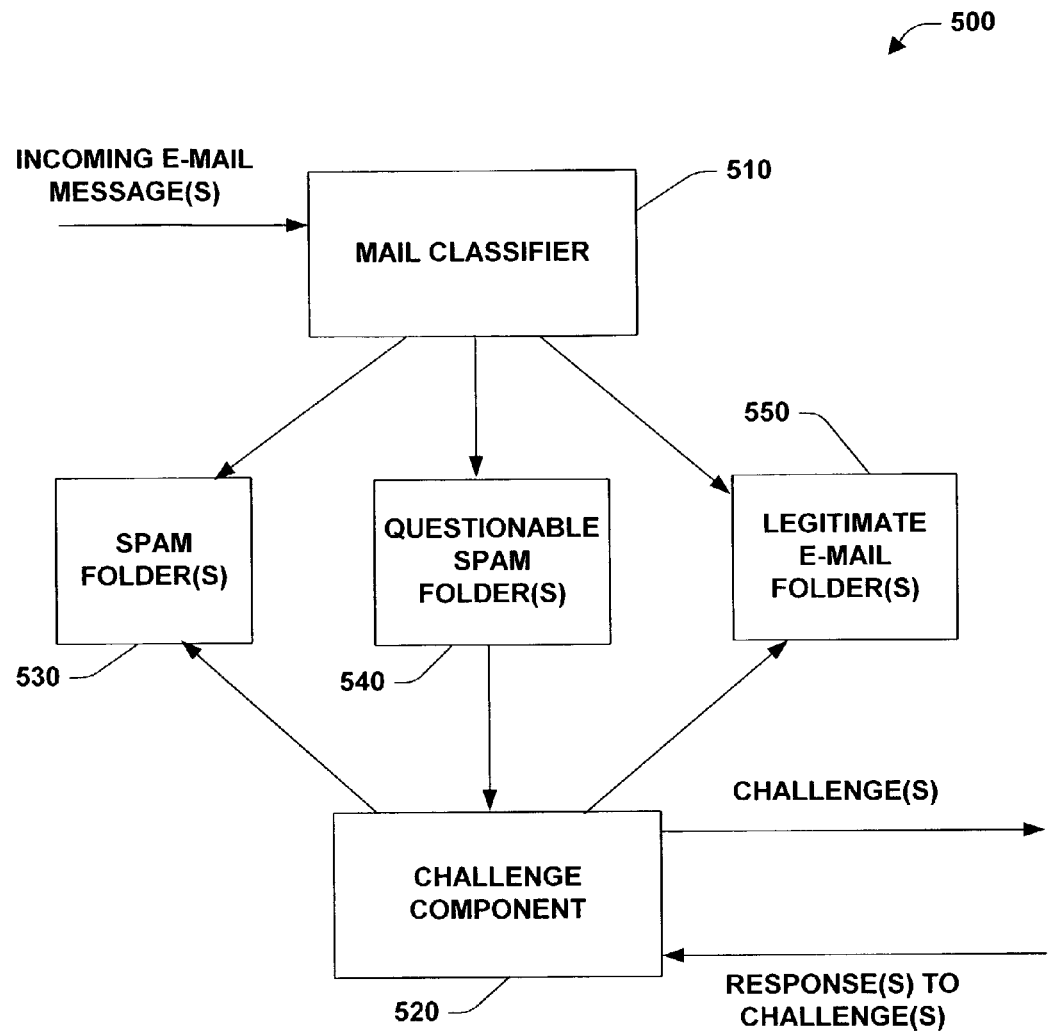
FIG. 5 is a block diagram of a system for detection of unsolicited e-mail in accordance with an aspect of the present invention.

FIG. 5 illustrates a system 500 for detection of unsolicited e-mail in accordance with an aspect of the present invention is illustrated. The system 500 includes a mail classifier 510, a challenge component 520, spam folder(s) 530, questionable spam folder(s) 540 and legitimate e-mail folder(s) 550. As discussed above, the mail classifier 510 determines the associated probability that an e-mail message is spam and stores the e-mail message in the spam folder(s) 530, the questionable spam folder(s) 540 or the legitimate e-mail folder(s) 550. Incoming e-mail message(s) are applied to an input of the mail classifier 510, which, in turn, probabilistically classifies each of these messages as either legitimate, questionable spam or spam. Based on its classification, each message is routed to one of the spam folder(s) 530, the questionable spam folder(s) 540 or the legitimate e-mail folder(s) 550.

E-mail message(s) having associated probabilities less than or equal to a first threshold are in legitimate e-mail folder(s) 550. E-mail message(s) having associated probabilities greater than the first threshold, but less than or equal to a second threshold are stored in questionable spam folder(s) 540. Further, e-mail message(s) having associated probabilities greater than the second threshold are stored in spam folder(s) 530. It is to be appreciated that the first threshold and/or the second threshold can be fixed, based on user preference(s) and/or adaptive (e.g., based, at least in part, upon available computational resources). Thereafter, the challenge component 520 can send a challenge to a sender of an e-mail message stored in the questionable spam folder(s) 540. For example, the challenge can be based, at least in part, upon a code embedded within the challenge, a computational challenge, a human challenge and/or a micropayment request.

Based, at least in part, upon a response to the challenge or lack thereof, the challenge component 520 can move the e-mail message from the questionable spam folder(s) 540 to the legitimate e-mail folder(s) 550 or the spam folder(s) 530. For example, upon receipt of an appropriate (e.g., correct) response to the challenge, the challenge component 520 can moved the e-mail message from the questionable spam folder(s) 540 to the legitimate e-mail folder(s) 550.

Further, upon receipt of an inappropriate (e.g., incorrect) response to the challenge and/or failure to receive a response to the challenge in a particular time period (e.g., 4 hours), the challenge component 520 can move the e-mail message from the questionable spam folder(s) 540 to the spam folder(s) 530.

Figure 6:
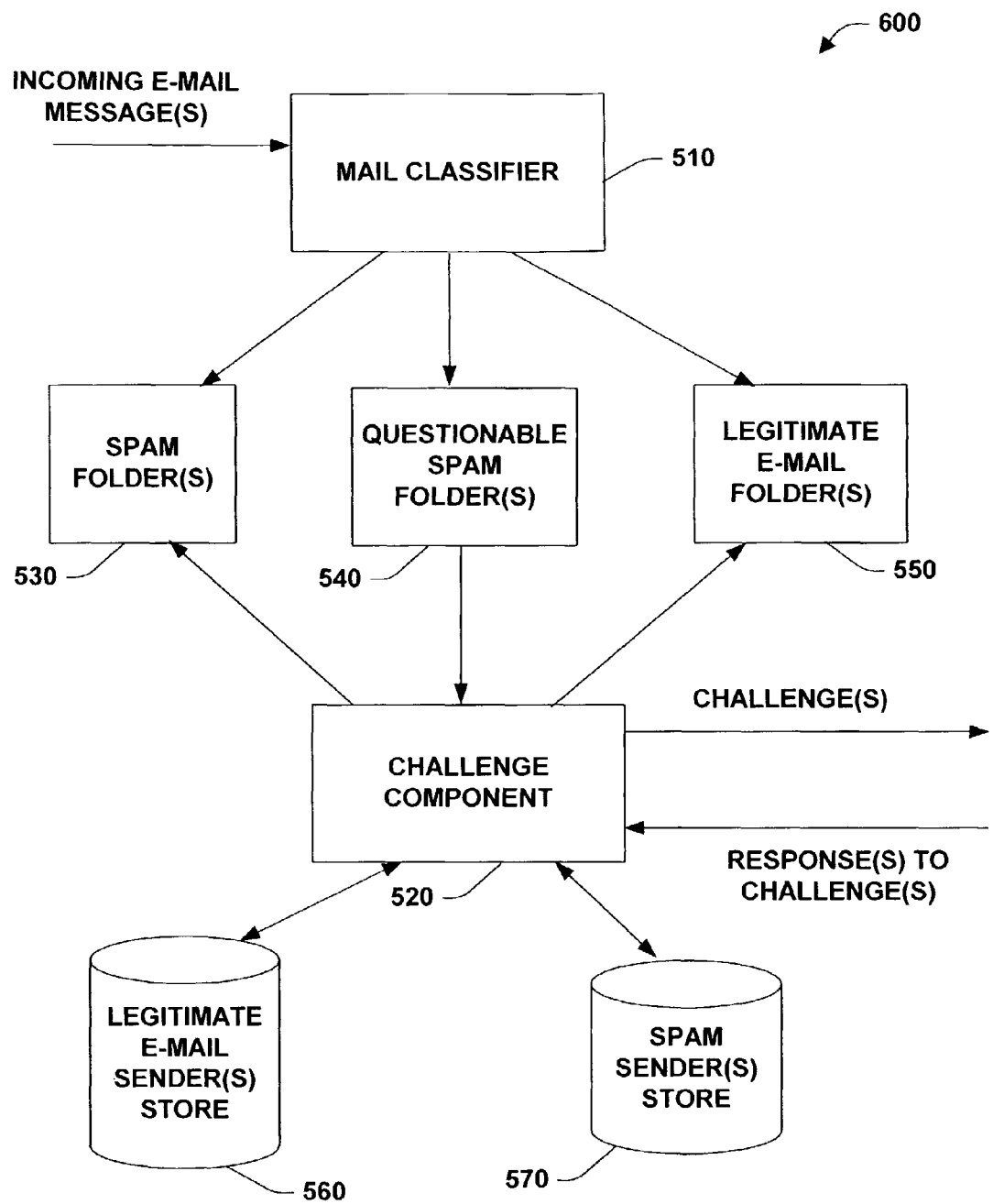
FIG. 6 is a block diagram of a system for detection of unsolicited e-mail in accordance with an aspect of the present invention.

Referring next to FIG. 6, a system 600 for detection of unsolicited e-mail in accordance with an aspect of the present invention is illustrated. The system 600 includes a mail classifier 510, a challenge component 520, spam folder(s) 530, questionable spam folder(s) 540 and legitimate e-mail folder(s) 550. The system 600 further includes a legitimate e-mail sender(s) store 560 and/or a spam sender(s) store 570.

The legitimate e-mail sender(s) store 560 stores information (e.g., e-mail address) associated with sender(s) of legitimate e-mail. E-mail message(s) from entities identified in the legitimate e-mail sender(s) store 560 are generally not challenged by the challenge component 520. Accordingly, in one example, e-mail message(s) stored in the spam folder(s) 530 or the questionable spam folder(s) 540 by the mail classifier 510 are moved to the legitimate mail folder(s) 550 if the sender of the e-mail message is stored in the legitimate e-mail sender(s) store 560.

Information (e.g., e-mail address(es)) can be stored in the legitimate e-mail sender(s) store 660 based on user selection (e.g., "do not challenge" particular sender command), a user's address book, address(es) to which a user has sent at least a specified number of e-mail messages and/or by the challenge component 520. For example, once a sender of an e-mail message has responded correctly to a challenge, the challenge component 520 can store information associated with the sender (e.g., e-mail address) in the legitimate e-mail sender(s) store 560.

The legitimate e-mail sender(s) store 560 can further store a confidence level associated with a sender of legitimate e-mail. For example, e-mail message(s) having associated probabilities less than or equal to the associated confidence level of the sender are not challenged by the challenge component 520 while those e-mail message(s) having associated probabilities greater than the associated confidence level are challenged by the challenge component 520. For example, the confidence level can be based, at least in part, upon the highest associated probability challenge to which the sender has responded.

In one example, a sender can be removed from the legitimate e-mail sender(s) store 560 based, at least in part, upon a user's action (e.g., e-mail message from the sender deleted as spam). In another example, sender(s) are added to the legitimate e-mail sender(s) store 560 after a user has sent one e-mail message to the sender.

The spam sender(s) store 570 stores information (e.g., e-mail address) associated with a sender of spam. Information can be stored in the spam sender(s) store 570 by a user and/or by the challenge component 520. For example, once a user has deleted a particular e-mail message as spam, information associated with the sender of the e-mail message can be stored in the spam sender(s) store 570. In another example, information associated with a sender of an e-mail message that incorrectly responded to a challenge and/or failed to respond to the challenge can be stored in the spam sender(s) store 570.

In one example, a unique-ID can be exchanged during the challenge process (e.g., to reduce the likelihood that a spammer can send spam using an address of a good sender). Further, sender(s) can use message signing. Unsigned message(s) from sender(s) stored in the legitimate e-mail sender(s) store 560 who usually sign their message(s) are subjected to the usual processing and potential challenging.

In another example, higher volume sender(s) of e-mail customize their "from" address (e.g., a unique "from" address for a recipient). For example, the "from" address can be based on a global secret key known to the sender and hashed with the recipient's e-mail address. Alternatively, a random number can be generated and stored for a recipient.

In yet a third example, a "per recipient ID" (PRID) is included in e-mail message(s). The PRID appends sender unique information in a special message header field. It is to be appreciated that the PRID does not have to be set on a per-sender basis. Thus, as mail is forwarded around an organization, inclusion on the legitimate e-mail sender(s) store 560 can be inherited. The PRID can be a public key for use with a public key signature system (e.g., OpenPGP or S/MIME).

Additionally, sender(s) of e-mail message(s) can include requests for challenge(s) (e.g., to facilitate scheduling of receipt of challenge(s)). For example, an e-mail message(s) can include a "CHALLENGE_ME_NOW: TRUE" header. This can cause a system 600 to automatically send a challenge and when a correct response is received to include the sender in the legitimate e-mail sender(s) store 560.

The challenge component 520 can be adapted to detect e-mail message(s) received from mailing list(s) (e.g., moderated mailing list(s) and/or unmoderated mailing list(s)). For example, a header line such as "Precedence: list" or "Precedence: bulk" can be included in e-mail message(s) received from a mailing list. In another example, the challenge component 520 detects that an e-mail message is spam based, at least in part upon, detection of a "sender" line being different from a "from" line. E-mail message header(s) typically contains two different from lines: one "from" line at the top (e.g., inserted by the from command used by SMTP), and a "from:" header field (e.g., the one that is usually displayed to the user.) For mailing lists, these may differ.

In one example, the challenge component 520 can detect e-mail message(s) from mailing list(s) and give a user the opportunity to include the mailing list(s) in the legitimate e-mail sender(s) store 560. The challenge component 520 can additionally include a level of confidence associated with the mailing list(s).

An issue to be addressed with regard to mailing list(s) is to reduce the likelihood that spam-like message(s) received from a mailing list will create a mail storm of challenges to the mailing list. This issue differs for the different list types. There are 8 situations, although many of them share the same solution. In particular, a mailing list can be can be moderated or unmoderated and additionally can have different level(s) of ability to respond to challenges. This creates 8 types.

Many moderated mailing list(s) include an "approved-by" header. For example, for moderated mailing list(s), it can be assumed that either all messages are good, or all are spam. For unmoderated lists, it can be assumed that some spam will be sent to the mailing list. Thus, for an unmoderated mailing list, the challenge component 520 can allow a user to set a threshold determining whether spam-like messages should be shown, or simply put in the spam folder(s) 530.

For example, an e-mail message from a mailing list has been detected, a user is given the user the opportunity to determine the level of confidence associated with the mailing list. A concern is sending too many challenges to mailing lists, especially those that do not have the ability to automatically respond to challenges. For moderated mailing list(s), for example, a user can be prompted to include the mailing list in the legitimate e-mail sender(s) store 560. In another example, the mailing list can respond to a challenge from the challenge component 520 and be included in the legitimate e-mail sender(s) store 560. In yet a third example, upon subscription to the mailing list, the mailing list prompts the user to include the mailing list in the user's legitimate e-mail sender(s) store 560.

For unmoderated mailing list(s), for example, a user can be prompted to set a threshold for the mailing list. E-mail message(s) having a probability of being spam above the threshold is moved to the spam folder(s) 530 and/or deleted. In another example, the mailing list can respond to a challenge from the challenge component 520 and be included in the legitimate e-mail sender(s) store 560. In yet a third example, upon subscription to the mailing list, the mailing list prompts the user to include the mailing list in the user's legitimate e-mail sender(s) store 560.

The challenge component 520 can take into account mailing list(s) that do not have the ability to automatically respond to challenges. In particular, for moderated mailing lists, the challenge component 520 can include the mailing list in the legitimate e-mail sender(s) store 560. For unmoderated mailing lists, the challenge component 520 can facilitate setting a threshold for the mailing list: messages above the threshold are challenged while messages below the threshold are let through Inclusion in the legitimate e-mail sender(s) store 560 can occur at an appropriate time. For mailing lists, it is likely that the user will not send mail TO the list. However, it is undesirable to include the mailing list in the legitimate e-mail sender(s) store 560 based on small amounts of mail received FROM the list. Otherwise a spammer could masquerade as a mailing list, send a small amount of messages (none of which are deleted as spam) and then send spam freely. In one implementation, the first time that mail from a mailing list arrives, and is not detected as spam, the user is prompted to add the mailing list to the legitimate e-mail sender(s) store 560, with an associated threshold. Since most mailing lists include a welcome message, if some welcome messages are included in training data, the welcome message is unlikely to be marked as spam.

If, however, the first messages that arrive are substantially all spam-like, then the messages should be included in the spam folder(s) 530. In particular, it is not desirable to let someone masquerade as a mailing list, and send spam. Thus, until the mail listing is included in the legitimate e-mail sender(s) store 560, the challenge component 520 can send challenge(s) to the mailing list as described supra. If the messages are spam-like but legitimate, the user may or may not receive them, depending on how the challenges are handled. If the challenges are not answered, they will not get through. Thus, it should be difficult to get spam through. Eventually, the mailing list will send a non-spam like message, and the user will be prompted to establish a policy for the mailing list.

It is to be appreciated that mailing list(s) may have a From address such that mail sent to that From address is sent to the entire list. If a list appears to be of that type, it is undesirable to send challenges to it as they might be received by substantially all readers of the mailing list. Apparent spam from such a mailing list before the mailing list has been included in the legitimate e-mail sender(s) store 560 can simply be ignored. The definition of inclusion in the legitimate e-mail sender(s) store 560 can be modified for mailing list(s). Given that the From line on a mailing list, even a moderated one is different for each sender, inclusion in the legitimate e-mail sender(s) store 560 can be based on other part(s) of the header. Often, the To line on a mailing list is the mailing list name (so that reply-all goes to the whole list.). Thus, for mailing lists, inclusion in the legitimate e-mail sender(s) store 560 can be based, at least in part, on the to-line. This can be in addition to from-line listing (e.g., if the sender of the mailing list is in the legitimate e-mail sender(s) store 560 that also should be sufficient). It is to be appreciated that other header lines, for mailing lists, such as sent-by, that can additionally and/or alternatively be included in the legitimate e-mail sender(s) store 560.

In order to determine validity of e-mail address(es), spammer(s) rely on "bouncing". Many conventional e-mail servers bounce e-mail back to it's sender if it is addressed to an invalid address. Thus, for e-mail servers those e-mail servers, the indicia of validity of an e-mail address increases if an e-mail message is not bounced. Accordingly, spammers can send more spam messages to the unbounced addresses.

For those e-mail servers which bounce e-mail, challenges of the present invention do not provide any additional information to the spammer (e.g., lack of bounce is an indication of validity of the address). Further, the e-mail server can itself send challenges via a system for detection of unsolicited e-mail for "semi-live" address(es) (e.g., valid but unmonitored address).

With regard to e-mail servers which do not bounce e-mail to invalid addresses, again the e-mail server can itself send challenges via a system for detection of unsolicited e-mail, for example, to have behavior of invalid address(es) be similar to the behavior of valid address(es). Further, in one implementation, a randomization factor is added to the probability that an e-mail is spam by the server system (e.g., to prevent attempts to circumvent adaptive spam filters).

Figure 7:
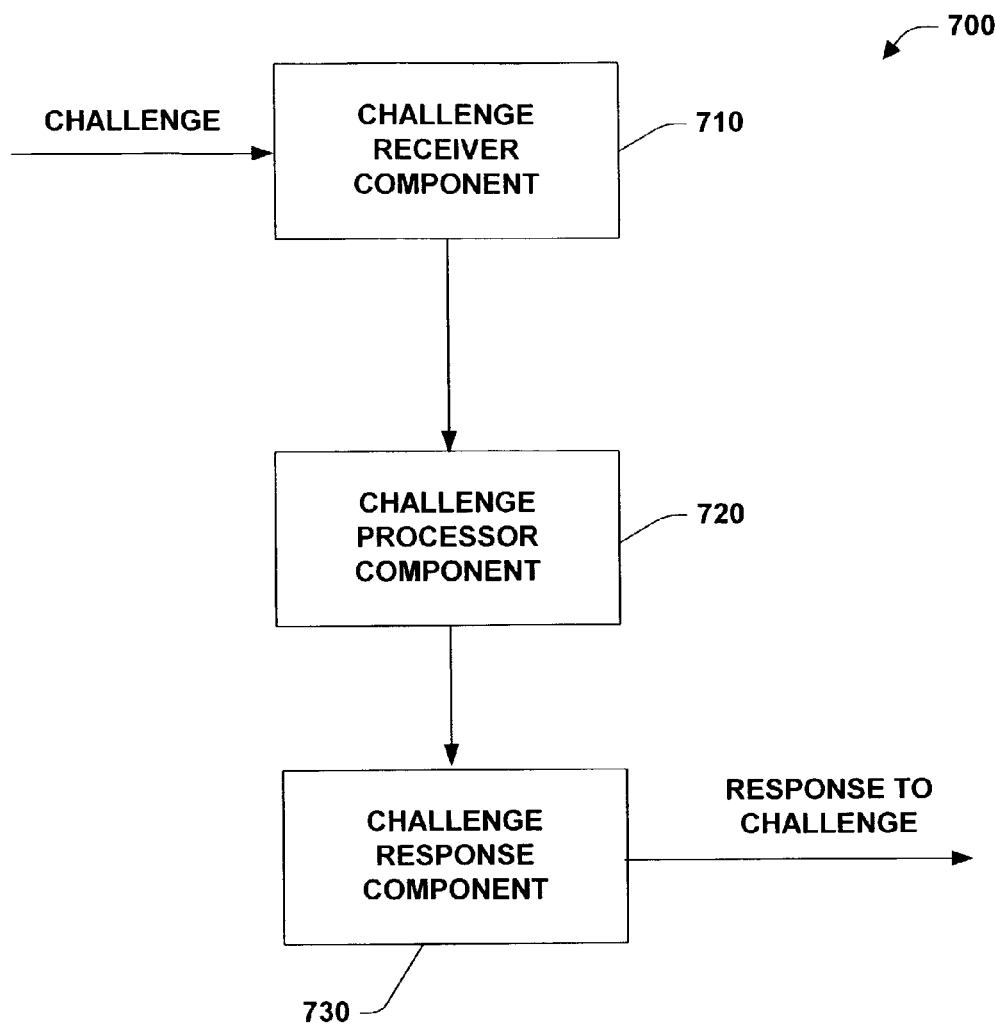
FIG. 7 is a block diagram of a system for responding to a challenge in accordance with an aspect of the present invention.

Next, turning to FIG. 7, a system 700 for responding to a challenge in accordance with an aspect of the present invention is illustrated. The system 700 includes a challenge receiver component 710, a challenge processor component 720 and a challenge response component 730.

The challenge receiver component 710 receives a challenge (e.g., to a previously sent e-mail). For example the challenge can be based, at least in part, upon a code embedded within the challenge, a computational challenge, a human challenge and/or a micropayment request.

In one example, the challenge receiver component 710 determines which of a plurality of challenge modalities to forward to the challenge processor component 720 (e.g., based on available computational resources and/or user preference). In another example, the challenge receiver component 710 provides information to a user to facilitate selection of one of a plurality of challenge modalities, thus, allowing a user to select which modality, if any, the user wishes to use to respond to the challenge. For example, the challenge receiver component 710 can provide information which may be helpful to the user in selecting an appropriate response modality, such as, an amount of computational resources required to respond to a computational challenge, an amount of a micropayment and/or a balance of a micropayment account. Once a challenge modality has been selected, the challenge is forwarded to the challenge processor 720.

It is to be appreciated that in certain instances the user may desire to not respond to the challenge, in which case, no information is sent to the challenge processor component 720 and/or the challenge response component 730.

The challenge processor component 720 processes the challenge and provides an output associated with the processed challenge. For example, when the challenge includes an embedded code, the challenge processor component 720 can provide an output to the challenge response component 730 which includes the embedded code. In the instance in which the challenge includes a computational challenge, the challenge processor component 720 can facilitate generation of a solution to the computational challenge.

When the challenge includes a human challenge, the challenge processor component 720 can provide information to a user to facilitate solving the human challenge. In one example, the human challenge can include a problem that is relatively easy for a human to solve, and relatively hard for a computer. In one example, the human challenge includes an image of a word (e.g., GIF or JPEG). The word is partially obscured by noise. The noise makes it hard to automatically develop a computer program to read the word (or at least, to use off-the-shelf components), without making it too hard for a human to do it. In this example, the challenge processor component 720 can provide the image of the word to the user. The user then provides the word back to the challenge processor component 720. The challenge processor component 720 provides an output including the word to the challenge response component 730.

When the challenge includes a micropayment request, the challenge processor component 720 can facilitate providing an output to the challenge response component 730. In one example, a response to a micropayment challenge is based on a one-time use "spam certificate" which can be issued by an issuing authority. The challenge processor component 720 can either automatically or based on user input provides a spam certificate number to the challenge response component 730. By providing the spam certificate number, the spam certificate is thereafter invalidated (e.g., one-time use).

In another example, a response to a micropayment challenge is based on a micropayment account. Each such response causes an amount to be removed from a micropayment account maintained, for example, by an issuing authority. The challenge processor component 720 can provide information associated with the micropayment account to the challenge response component 730.

The challenge response component 730 provides a response to the challenge based, at least in part, upon the output associated with the processed challenge. For example, the response to the challenge can include an embedded code, solution to a computational challenge, solution to a human challenge and/or micropayment.

In one implementation, for example, to reduce a likelihood of a denial-of-service attack, computational challenges are ordered by the quantity of challenges already processed for a given message. Message(s) with fewer processed challenge(s) are processed before message(s) having a greater quantity of processed challenges are processed (e.g., as computational resources are available). Thus, in the instance in which a message is sent to a mailing list, a recipient could send computational challenges in an effort to maliciously cause a denial-of-service attack. However, once one or more computational challenges are processed for that message, computational challenges of other messages having less processed challenges are given priority, thus reducing the likelihood of a denial-of-service.

In view of the exemplary systems shown and described above, methodologies that may be implemented in accordance with the present invention will be better appreciated with reference to the flow chart of FIGS. 8, 9, 10 and 11. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 8:
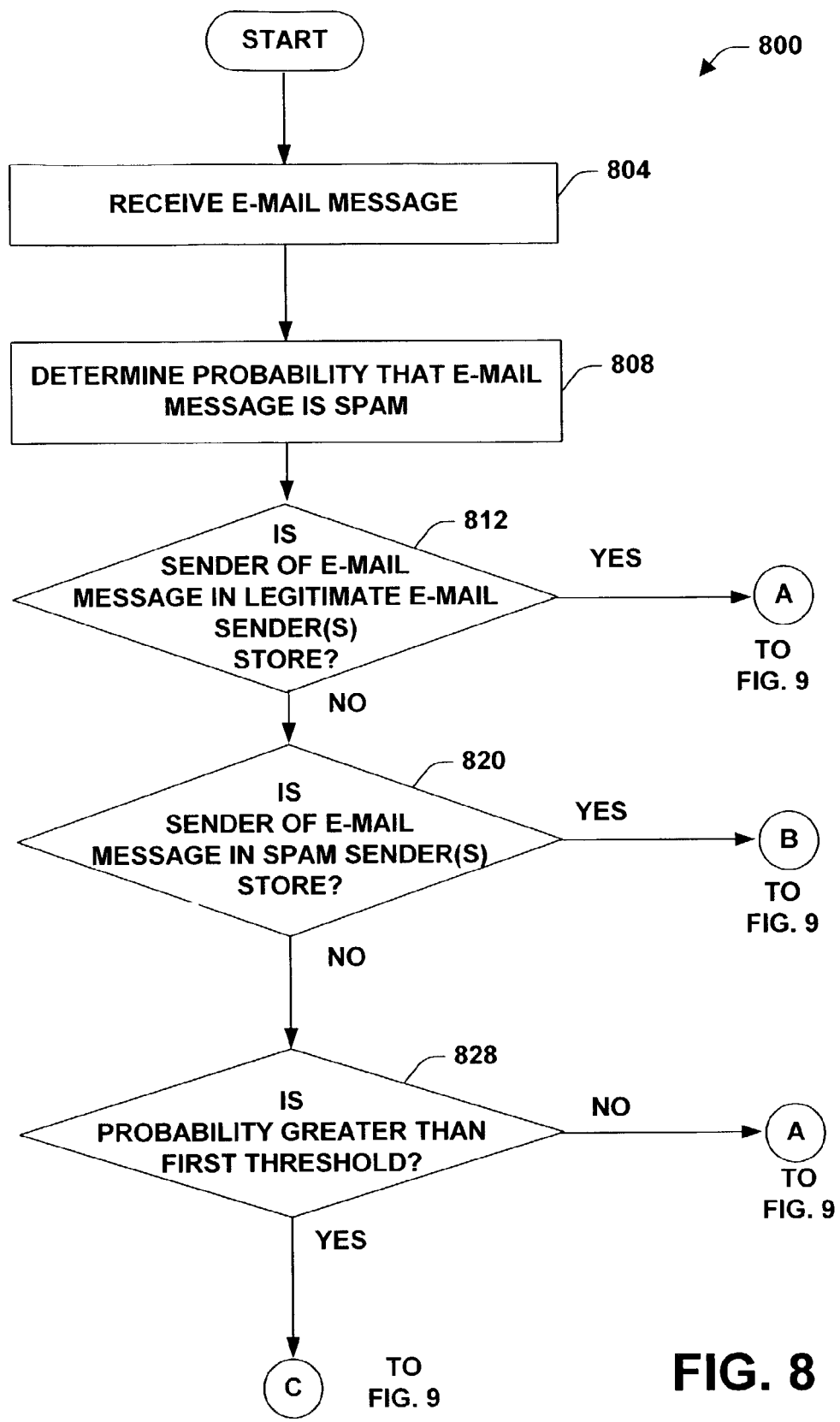
FIG. 8 is a flow chart illustrating a method for detecting unsolicited e-mail in accordance with an aspect of the present invention.
Figure 9:
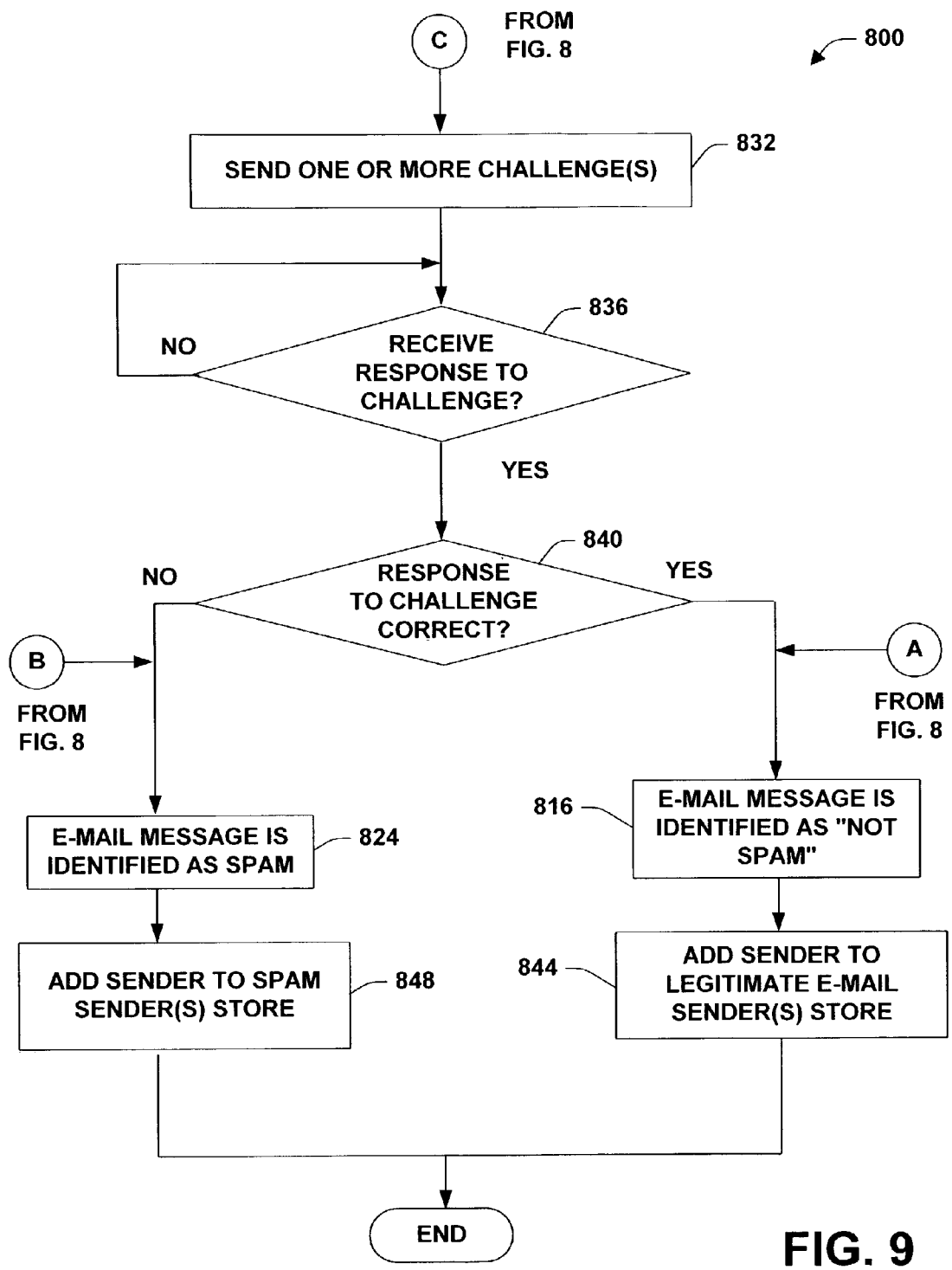
FIG. 9 is a flow chart further illustrating the method of FIG. 8.

Turning to FIGS. 8 and 9, a method 800 for detecting an unsolicated e-mail message in accordance with an aspect of the present invention is illustrated. At 804, an e-mail message is received. At 808, a probability that the e-mail message is spam is determined (e.g., by a mail classifier).

At 812, a determination is made as to whether the sender of the e-mail message is in a legitimate e-mail sender(s) store. If the determination at 812 is YES, processing continues at 816. If the determination at 812 is NO, at 820, a determination is made as to whether the sender of the e-mail message is in a spam sender(s) store. If the determination at 820 is YES, processing continues at 824. If the determination at 820 is NO, at 828, a determination is made as to whether the probability that the e-mail message is spam is greater than a first threshold. If the determination at 828 is NO, processing continues at 816. If the determination at 828 is YES, at 832, one or more challenge(s) are sent to the sender of the e-mail message.

At 836, a determination is made as to whether a response to the challenge(s) has been received. If the determination at 836 is NO, processing continues at 836. If the determination at 836 is YES, at 840, a determination is made as to whether the response received to the challenge is correct. If the determination at 840 is YES, processing continues at 816. If the determination at 840 is NO, processing continues at 824.

At 816, the e-mail message is identified as "not spam" (e.g., placed in legitimate e-mail folder(s) and/or associated probability decreased). Next, at 844, the sender of the e-mail message is added to the legitimate e-mail sender(s) store and no further processing occurs.

At 824, the e-mail message is identified as spam (e.g., placed in spam folder(s), deleted and/or associated probability increased). Next, at 848, the sender of the e-mail message is added to the spam sender(s) store and no further processing occurs.

Figure 10:
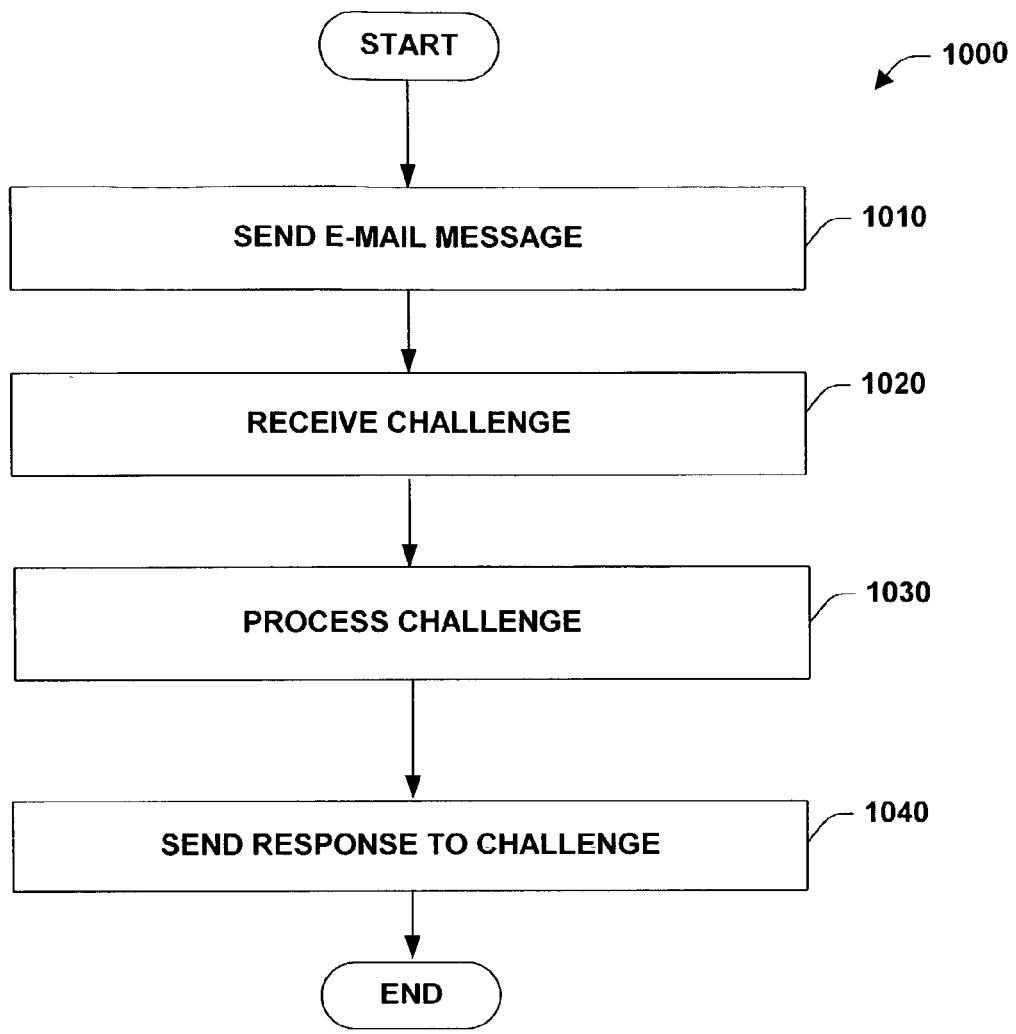
FIG. 10 is a flow chart illustrating a method for responding to a challenge in accordance with an aspect of the present invention.

Referring next to FIG. 10, a method 1000 for responding to a challenge in accordance with an aspect of the present invention is illustrated. At 1010, an e-mail message is sent. At 1020, a challenge is received (e.g., an embedded code, a computational challenge, a human challenge and/or a request for a micropayment). At 1030, the challenge is processed. At 1040, a response to the challenge is sent.

Figure 11:
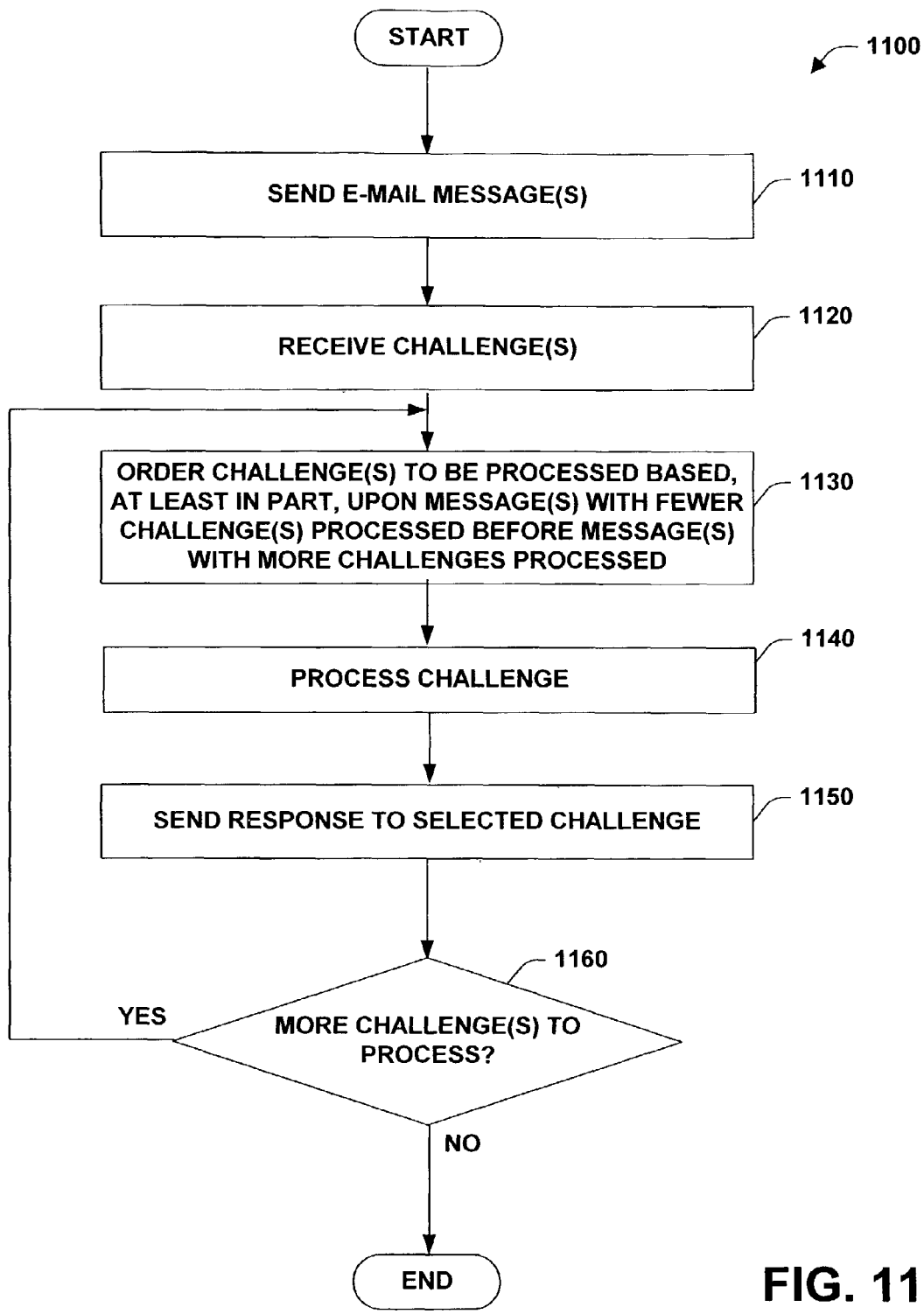
FIG. 11 is a flow chart illustrating a method for responding to challenges in accordance with an aspect of the present invention.

Next, turning to FIG. 11, a method 1100 for responding to challenges in accordance with an aspect of the present invention is illustrated. At 1110, e-mail message(s) are sent. At 1120, challenge(s) are received (e.g., each challenge having an embedded code, a computational challenge, a human challenge and/or a request for a micropayment). At 1130, the challenge(s) to be processed are ordered based, at least in part, upon message(s) with fewer challenge(s) processed before message(s) with more challenge(s) processed (e.g., to reduce denial-of-service attacks). At 1140, the challenge is processed. At 1150, a response to the selected challenge is sent. At 1160, a determination is made as to whether there are more challenge(s) to process. If the determination at 1160 is YES, processing continues at 1130. If the determination at 1160 is NO, no further processing occurs.

Figure 12:
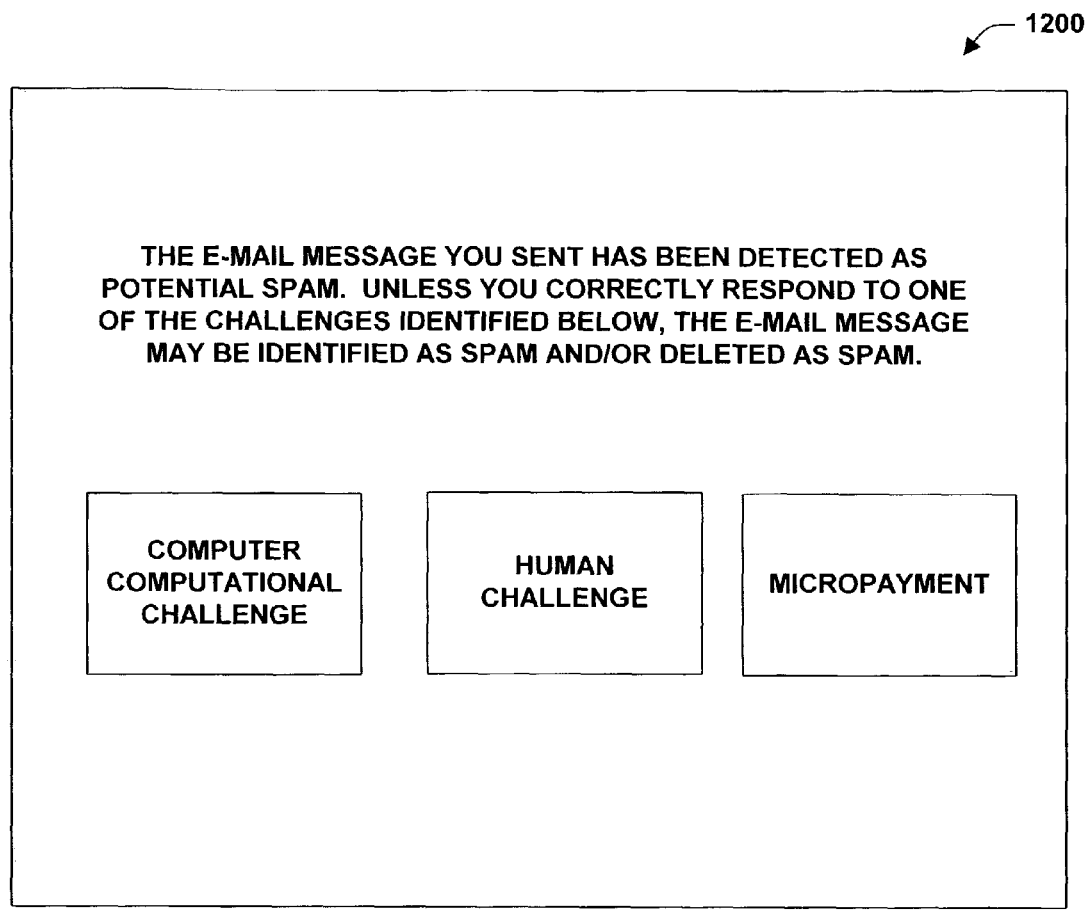
FIG. 12 is an exemplary user interface for responding to a plurality of challenges in accordance with an aspect of the present invention.

Turning to FIG. 12, an exemplary user interface 1200 for responding to a plurality of challenges in accordance with an aspect of the present invention is illustrated. In this exemplary user interface, a user is prompted with the message:

THE E-MAIL MESSAGE YOU SENT HAS BEEN DETECTED AS POTENTIAL SPAM. UNLESS YOU CORRECTLY RESPOND TO ONE OF THE CHALLENGES IDENTIFIED BELOW, THE E-MAIL MESSAGE MAY BE IDENTIFIED AS SPAM AND/OR DELETED AS SPAM.

The user is presented with three options: computer computational challenge, human challenge and micropayment. Based, at least in part, upon the user's selection, the selected challenge can then be processed.

Figure 13:
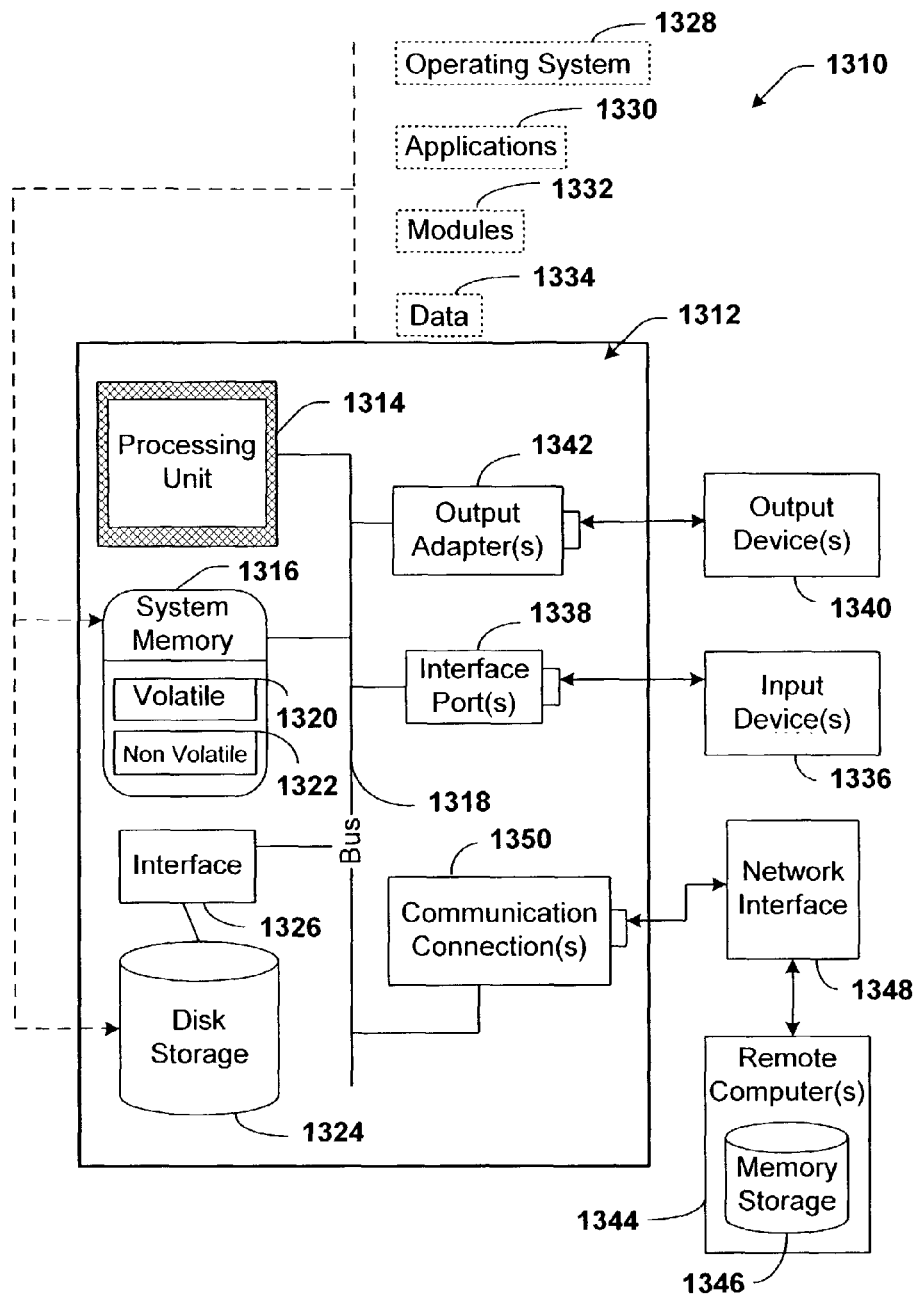
FIG. 13 illustrates an example operating environment in which the present invention may function.

In order to provide additional context for various aspects of the present invention, FIG. 13 and the following discussion are intended to provide a brief, general description of a suitable operating environment 1310 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 13-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1302.3, Token Ring/IEEE 1302.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An e-mail server that facilitates detection of unsolicited e-mail, comprising:
    a processor configured to execute:
        an e-mail component that receives and stores messages and computes associated probabilities that the e-mail messages are spam for valid but unmonitored e-mail addresses;
        a mail classifier that receives e-mail messages and determines the associated probability that a received e-mail message is spam for each of the messages; and
        a challenge component that sends a challenge to an originator of the received e-mail message to a valid but unmonitored e-mail address, where the received e-mail message has an associated probability of being spam greater than a first threshold and a difficulty of the challenge being based, at least in part, upon the associated probability that the e-mail message is spam, and the challenge component desists from sending the challenge to the originator of the received e-mail message to the valid but unmonitored e-mail address, where the associated probability of the received message being spam is less than or equal to the first threshold, the challenge being sent, at least in part, to obfuscate validity of the valid but unmonitored e-mail address to the originator of the received e-mail message.

2. The system of claim 1, the challenge component further modifies the associated probability that the e-mail message is spam based, at least in part, upon a response to the challenge.

3. The system of claim 1, the challenge including at least one of an alphanumeric embedded code, a computational challenge, or a human challenge.

4. An e-mail server that facilitates detection of unsolicited e-mail, comprising:
    a processor configured to execute:
        an e-mail component that receives and stores messages and computes associated probabilities that the e-mail messages are spam for valid but unmonitored e-mail addresses;
        a mail classifier that receives e-mail messages and determines the associated probability that a received e-mail message is spam for each of the messages; and
    a challenge component that sends a challenge to an originator of the received e-mail message to a valid but unmonitored e-mail address, the received e-mail message having an associated probability of being spam greater than a first threshold and desists from sending the challenge to the originator of the received e-mail message to the valid but unmonitored e-mail address, where the associated probability of the received message being spam is less than or equal to the first threshold, the challenge being sent, at least in part, to obfuscate validity of the valid but unmonitored e-mail address to the originator of the received e-mail message, the challenge including a computational challenge comprising a one-way hash of values derived from the received message including the message content, message recipient, message sender, message time stamp, and recipient stamp.

5. An e-mail server that facilitates detection of unsolicited e-mail, comprising:
    a processor configured to execute:
        an e-mail component that receives and stores messages and computes associated probabilities that the e-mail messages are spam for valid but unmonitored e-mail addresses;
        a mail classifier that receives e-mail messages and determines the associated probability that a received e-mail message is spam for each of the messages;
        a challenge component that sends a challenge to an originator of the received e-mail message to a valid but unmonitored e-mail address, the received e-mail message having an associated probability of being spam greater than a first threshold and desists from sending the challenge to the originator of the received e-mail message to the valid but unmonitored e-mail address, where the associated probability of the received message being spam is less than or equal to the first threshold, the challenge being sent, at least in part, to obfuscate validity of the valid but unmonitored e-mail address to the originator of the received e-mail message, the challenge including a micropayment request; and
    wherein at least one of:

the challenge includes a computational challenge comprising a one-way hash of values derived from the incoming message including the message content, message recipient, message sender, message time stamp, and recipient stamp, the challenge component sends the sender a choice of challenges, the choice of challenges being based, at least in part, upon an adaptive filter; or the mail classifier determines an associated probability that the incoming e-mail message is spam and a difficulty of the challenge being sent being based, at least in part, upon the associated probability that the e-mail message is spam.

6. An e-mail server that facilitates detection of unsolicited e-mail, comprising:

a processor configured to execute:

an e-mail component that receives and stores messages and computes associated probabilities that the e-mail messages are spam for valid but unmonitored e-mail addresses;

a mail classifier that receives e-mail messages and determines the associated probability that a received e-mail message is spam for each of the messages; and a challenge component that sends a challenge to an originator of the received e-mail message to a valid but unmonitored e-mail address, the received e-mail message having an associated probability of being spam greater than a first threshold and desists from sending the challenge to the originator of the received e-mail message to the valid but unmonitored e-mail address, where the associated probability of the received message being spam is less than or equal to the first threshold, the challenge being sent, at least in part, to obfuscate validity of the valid but unmonitored e-mail address to the originator of the received e-mail message, wherein the challenge component sends the originator a choice of challenges, the choice of challenges being based upon an adaptive spam filter.

7. A system that facilitates detection of unsolicited messages, comprising:

a processor configured to execute:

a mail classifier that receives an incoming message and classifies the incoming message as spam or a legitimate message and reclassifies the incoming message based at least on a received challenge response, wherein reclassifying the incoming message schedules an update to the mail classifier with a new training set including the reclassified message;

a challenge component that sends a challenge including a micropayment request to a sender of the message where the message is classified as spam and refrains from sending the challenge to the sender where the message is classified as a legitimate message; and wherein at least one of:

the challenge includes a computational challenge comprising a one-way hash of values derived from the incoming message including the message content, message recipient, message sender, message time stamp, and recipient stamp, the challenge component sends the sender a choice of challenges, the choice of challenges being based, at least in part, upon an adaptive spam filter; or the mail classifier determines an associated probability that the incoming e-mail message is spam and a difficulty of the challenge being sent being based, at least in part, upon the associated probability that the e-mail message is spam.

8. The system of claim 7, the mail classifier further stores the incoming message in a spam folder or a legitimate message folder.

9. The system of claim 8, the challenge component further moves the message from the spam folder to the legitimate message folder based, at least in part, upon a response to the challenge.

10. The system of claim 7, the challenge including at least one of an embedded code, a computational challenge, or a human challenge.

11. The system of claim 7, further comprising a legitimate message sender(s) store that stores information associated with a sender of legitimate message(s).

12. The system of claim 11, the challenge component adds information associated with the sender of the message to the legitimate message sender(s) store, where the challenge is responded to correctly.

13. The system of claim 7, further comprising a spam sender(s) store that stores information associated with a sender of spam.

14. A system that facilitates detection of unsolicited e-mail, comprising:

a processor configured to execute:

a mail classifier that receives an incoming e-mail message and classifies the incoming e-mail message as spam, questionable spam and legitimate e-mail;

a legitimate e-mail sender store that stores information comprising a confidence level associated with the sender of the e-mail message classified as legitimate e-mail; and a challenge component that sends a challenge including a micropayment request to a sender of an e-mail message classified as questionable spam and sends the challenge to the sender where the e-mail message is classified as legitimate e-mail when the e-mail has an associated probability of being spam greater than the associated confidence level of the sender; and wherein at least one of:

the challenge includes a computational challenge comprising a one-way hash of values derived from the incoming message including the message content, message recipient, message sender, message time stamp, and recipient stamp, the challenge component sends the sender a choice of challenges, the choice of challenges being based, at least in part, upon an adaptive spam filter; or the mail classifier determines an associated probability that the incoming e-mail message is spam and a difficulty of the challenge being sent being based, at least in part, upon the associated probability that the incoming e-mail message is spam.

15. The system of claim 14, the mail classifier further stores the incoming e-mail message in a spam folder, a questionable spam or a legitimate mail folder.

16. The system of claim 15, the challenge component further moves the e-mail message from the questionable spam folder to the spam folder or the legitimate mail folder based, at least in part, upon a response to the challenge.

17. The system of claim 14, the challenge further including at least one of an embedded code, a computational challenge, or a human challenge.

18. The system of claim 14, further comprising a spam sender(s) store that stores information associated with a sender of spam.

19. The system of claim 14, the e-mail message including a per recipient ID.

20. The system of claim 14, the challenge component further detects whether the e-mail message is from a mailing list.

21. The system of claim 20, the challenge component further detects whether the mailing list is moderated or unmoderated.

22. The system of claim 14, the mail classifier:
when the mailing list is moderated, prompting a user to include the mailing list in the legitimate e-mail sender store; and
when the mailing list is unmoderated, prompting a user to set a threshold for the mailing list that will determine treatment of spam-like messages from the mailing list.

23. A computer implemented method for detecting unsolicited e-mail, comprising: sending, via a computer, a first challenge to a sender of an e-mail message classified as questionable spam;
dispatching, via the computer, a choice of challenges corresponding to a second challenge being dispatched to a sender of a second e-mail message, wherein the sender of the second e-mail message is classified as a legitimate sender and the choice of challenges is based, at least in part, upon an adaptive spam filter;
receiving, at the computer:
a response to the first challenge to the sender of the e-mail message classified as questionable spam, and
a response to the second challenge that was sent to the legitimate sender; and
modifying, via the computer;
the classification of the first e-mail message based, at least in part, upon the response to the first challenge, and
the classification of the second e-mail message based, at least in part, upon the response to the second challenge and a changing subjective perception or preference of a user, wherein the modification of the classification of the second e-mail message includes decreasing a probability that the legitimate e-mail message is spam.

24. The method of claim 23, further comprising at least one of the following acts,
receiving the e-mail message;
classifying the e-mail message as one of spam, questionable spam and legitimate e-mail;
determining whether the sender is stored in a legitimate e-mail sender(s) store; and
determining whether the sender is in a spam sender(s) store.

25. The method of claim 23, the challenge being at least one of an embedded code, a computational challenge, a human challenge or a micropayment request.

26. The method of claim 23, further comprising responsive to the classification of the second e-mail message being modified, at a predetermined time, serving contents of the legitimate e-mail folder as a Previously Presented training set to update a mail classifier component.

27. The method of claim 23, wherein at least one of:
the first challenge or the second challenge includes a computational challenge comprising a one-way hash of values derived from the first e-mail message or the second e-mail message, respectively, the respective e-mail message including the message content, message recipient, message sender, message time stamp, and recipient stamp,
the first challenge or the second challenge includes a micropayment request; or the mail classifier determines an associated probability that the first e-mail message or the second e-mail message, respectively, is spam and a difficulty of the challenge being sent is based, at least in part, upon the associated probability that the first e-mail message or the second e-mail message, respectively, is spam.

28. A method for responding to e-mail challenges, comprising:
maintaining a quantity of challenges processed corresponding to a particular e-mail message of a plurality of e-mail messages to mitigate denial-of-service attacks;
receiving, at an e-mail originator computer, a plurality of challenges to the particular e-mail message of the plurality of e-mail messages, the challenges received based at least in part on an inference by a computer initiator of the challenges that the particular e-mail message is legitimate e-mail;
ordering for processing, via the e-mail originator computer, pending selected challenges corresponding to the plurality of e-mail messages based, at least in part, upon the quantity of challenges previously processed for respective corresponding messages to mitigate denial-of-service attacks;
processing, via the e-mail originator computer, a first challenge of the pending selected challenges, the first challenge corresponding to a message having a fewest previously processed challenges;
sending, via the e-mail originator computer, a response to the first challenge of the pending challenges corresponding to the message having the fewest previously processed challenges;
responsive to sending the response to the first challenge of the pending challenges corresponding to the message having the fewest previously processed challenges, incrementing the quantity of challenges processed corresponding to that message.

29. The method for responding to e-mail challenges, as recited in claim 28 further comprising:
receiving, at the e-mail originator computer, a plurality of challenges to e-mail messages, the plurality of challenges corresponding to the particular message, wherein the plurality of challenges include:
a challenge to return a code embedded in the individual message;
a challenge to complete a computational challenge;
a challenge to identify a human challenge;
a challenge to pay a micropayment; and
selecting, at the e-mail originator computer, a challenge to complete corresponding to the particular message.

30. The method for responding to e-mail challenges as recited in claim 28, wherein at least one of:
the challenge being received includes a computational challenge comprising a one-way hash of values derived from the particular e-mail message including one or more of the message content, message recipient, message sender, message time stamp, or recipient stamp,
the challenge being received includes a micropayment request;
the challenge being received including a choice of challenges being based, at least in part, upon a filter; or
a difficulty of the challenge being received being based, at least in part, upon an associated probability that the incoming e-mail message is spam.

31. A computer storage device storing computer executable components of a system that facilitates detection of unsolicited e-mail, comprising:
a mail classifier component that:

configures at least a legitimate-email folder and a spam e-mail folder; receives e-mail messages;
determines an associated probability that the e-mail messages are spam;
classifies each of the e-mail messages as one of at least legitimate or spam; and
reclassifies an e-mail message when a challenge response is received from a sender of an e-mail message;
a challenge component that sends a generated challenge having at least a difficulty of a first level or a micropayment of a first amount to the sender of the e-mail message having an associated probability of being spam greater than a first threshold, and desists from generating challenge content where the associated probability of being spam is less than or equal to the first threshold, wherein the challenge component sends a more onerous challenge to the originator of an e-mail message based at least on the e-mail message having a greater associated probability of being spam, the more onerous challenge including a challenge more difficult than the first level or a challenge requiring a micropayment greater than the first amount; and
at least one of the computer executable components, responsive to the e-mail message being reclassified, being configured to serve contents of at least one of the legitimate e-mail folder or the spam e-mail folder as a new training set to update the mail classifier component.

32. The computer storage device as recited in claim 31, wherein at least one of:
the generated challenge includes a computational challenge comprising a one-way hash of values derived from the incoming message including one or more of the message content, message recipient, message sender, message time stamp, or recipient stamp,
the challenge component sends the sender a choice of generated challenges, the choice of generated challenges being based, at least in part, upon a filter; or
a difficulty of the generated challenge being sent being based, at least in part, upon the associated probability that the e-mail message is spam.

33. A computer storage device having computer executable instructions encoded thereon, the computer executable instructions programmed to configure a computer to perform operations comprising:
detecting whether an e-mail message is from a mailing list and in an event that the e-mail message is from a mailing list, whether the mailing list is moderated or unmoderated;
in an event the e-mail message is determined to be from a moderated mailing list, including the mailing list in a legitimate e-mail sender store;
in an event the e-mail message is determined to be from an unmoderated mailing list, prompting for a first threshold probability to be associated with the unmoderated mailing list;
in an event the e-mail message is determined not to be from a mailing list, prompting for a first threshold probability to be associated with a sender of the e-mail message;
determining an associated probability that the e-mail message is spam;
sending a challenge to a respective mailing list or sender of the e-mail message having an associated probability greater than the first threshold and refraining from sending the challenge where the associated probability is less than the first threshold probability, a difficulty of the challenge being based, at least in part, upon the associated probability that the e-mail message is spam; and
automatically modifying the associated probability that the e-mail is spam based on a response to a challenge.

34. The computer storage device as recited in claim 33, wherein at least one of:
the challenge being sent includes a computational challenge comprising a one-way hash of values derived from the e-mail message including one or more of the message content, message recipient, message sender, message time stamp, or recipient stamp,
the challenge being sent includes a micropayment request; or
the challenge being sent including a choice of challenges being based, at least in part, upon a filter.

* * * * *